US012794761B2

(12) United States Patent
Cheng

(10) Patent No.: US 12,794,761 B2
(45) Date of Patent: Nov. 10, 2026

(54) SYSTEMS AND METHODS FOR FAULT DETECTION BASED ON PEER STATISTICS

(71) Applicant: Juniper Networks, Inc., Sunnyvale, CA (US)

(72) Inventor: Jing Cheng, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 1493 days.

(21) Appl. No.: 16/696,281

(22) Filed: Nov. 26, 2019

(65) Prior Publication Data

US 2021/0160125 A1 May 27, 2021

(51) Int. Cl.
*H04L 41/0654* (2022.01)
*G06N 20/00* (2019.01)
(Continued)

(52) U.S. Cl.
CPC ......... *H04L 41/0654* (2013.01); *G06N 20/00* (2019.01); *H04L 41/142* (2013.01); (Continued)

(58) Field of Classification Search
None
See application file for complete search history.

(56) References Cited

U.S. PATENT DOCUMENTS 9,485,675 B2 11/2016 Miyabayashi et al.
9,690,645 B2 6/2017 Samuni et al.
(Continued)

FOREIGN PATENT DOCUMENTS

CN 101989766 A 3/2011
CN 102017689 A 4/2011
(Continued)

OTHER PUBLICATIONS

"European Application Serial No. 20159608.7, Extended European Search Report mailed Sep. 29, 2020", 17 pgs.
(Continued)

*Primary Examiner* — Suk Jin Kang
(74) *Attorney, Agent, or Firm* — Shumaker & Sieffert P.A.

(57) ABSTRACT

While many network components include diagnostic capabilities that are sometimes implemented at the hardware level, these diagnostics can be unreliable. Thus, false indications of operability or inoperability can result when these diagnostics are relied upon exclusively. To better detect operational problems with a network component, operational parameters from the network component and one or more peer devices are analyzed to determine whether the network component is operational. In some embodiments, data derived from these operational parameters is provided to a supervised machine learning model, and the model provides output indicating the operational status of the network component. Some embodiments binarize operational parameters of a device and compute a maximum duration the binarized parameters indicate inactivity of the device. Some embodiments compute a moving average of the binarized parameters. The maximum duration and/or moving average(s) are provided to the machine learning model in some embodiments.

20 Claims, 14 Drawing Sheets

(51) Int. Cl.

| | |
|---|---|
| ***H04L 41/142*** | (2022.01) |
| ***H04W 24/08*** | (2009.01) |
| ***H04W 84/12*** | (2009.01) |
| ***H04W 88/08*** | (2009.01) |

(52) U.S. Cl.

CPC ............ *H04W 24/08* (2013.01); *H04W 84/12* (2013.01); *H04W 88/08* (2013.01)

(56) References Cited

U.S. PATENT DOCUMENTS

| | | | | |
|---|---|---|---|---|
| 9,826,416 | B2 * | 11/2017 | Hussein | H04W 24/02 |
| 11,968,422 | B2 | 4/2024 | Zhang et al. | |
| 2011/0051677 | A1 * | 3/2011 | Jetcheva | H04W 72/0486 370/329 |
| 2012/0002537 | A1 | 1/2012 | Bao et al. | |
| 2015/0200738 | A1 | 7/2015 | Wetterwald et al. | |
| 2015/0237519 | A1 * | 8/2015 | Ghai | H04L 63/0892 380/270 |
| 2017/0091008 | A1 * | 3/2017 | Cherbakov | G06F 11/079 |
| 2017/0135019 | A1 * | 5/2017 | Vamaraju | H04W 36/30 |
| 2018/0067779 | A1 * | 3/2018 | Pillalamarri | H04L 41/044 |
| 2018/0197091 | A1 * | 7/2018 | Acar | G05B 19/41875 |
| 2018/0197092 | A1 * | 7/2018 | Acar | G06N 20/00 |
| 2019/0014488 | A1 * | 1/2019 | Tan | G06N 3/084 |
| 2019/0053150 | A1 * | 2/2019 | Abouelmaati | H04W 84/045 |
| 2019/0171208 | A1 * | 6/2019 | Magalhaes de Matos | G08G 1/164 |
| 2019/0335005 | A1 * | 10/2019 | Dain | H04L 67/51 |
| 2020/0012549 | A1 * | 1/2020 | Johnsson | G06N 3/088 |
| 2020/0084129 | A1 * | 3/2020 | Davi | H04L 67/1061 |
| 2020/0137561 | A1 * | 4/2020 | Agarwal | H04W 4/80 |
| 2020/0175370 | A1 * | 6/2020 | Zhang | H04L 67/10 |
| 2020/0233773 | A1 * | 7/2020 | Hsu | H04L 67/10 |
| 2020/0348994 | A1 * | 11/2020 | Kao | G06F 11/0751 |
| 2020/0379023 | A1 * | 12/2020 | Cardozo | G01R 31/08 |
| 2020/0382973 | A1 * | 12/2020 | Cardozo | G01R 22/068 |
| 2021/0014127 | A1 * | 1/2021 | Iyengar | H04L 41/12 |
| 2021/0059004 | A1 * | 2/2021 | Wu | H04W 76/28 |
| 2021/0105848 | A1 * | 4/2021 | Jung | H04L 41/16 |
| 2021/0219201 | A1 * | 7/2021 | Shimizu | H04W 36/305 |
| 2021/0250372 | A1 * | 8/2021 | Barnes | H04L 67/303 |
| 2023/0046347 | A1 * | 2/2023 | Schwengler | H04W 40/04 |

FOREIGN PATENT DOCUMENTS

| | | | |
|---|---|---|---|
| CN | 103746846 | A | 4/2014 |
| CN | 104956373 | A | 9/2015 |
| CN | 106254150 | A | 12/2016 |
| CN | 107403005 | A | 11/2017 |
| CN | 108965934 | A | 12/2018 |
| EP | 2230864 | | 9/2010 |
| EP | 2466945 | A1 | 6/2012 |

OTHER PUBLICATIONS

Adya, A, "Architecture and Techniques for Diagnosing Faults in IEEE802.il Infrastructure Networks", Proceeding Mobicom '04 Proceedings of the10th Annual International Conference on Mobile Computing and Networking, ACM, 2Penn Plaza, Suite 701 New York NY 10121-0701 USA,, (Sep. 26, 2004), 30-44.

Response filed Dec. 1, 2021 to the Extended European Search Report mailed Sep. 29, 2020 received in counterpart European Application Serial No. 20159608.7, 28 pgs.

Communication pursuant to Article 94(3) EPC from counterpart European Application No. 20159608.7 dated Feb. 3, 2023, 10 pp.

Response to Communication pursuant to Article 94(3) EPC dated Feb. 8, 2023, from counterpart European Application No. 20159608.7 filed Jun. 6, 2023, 13 pp.

First Office Action and Search Report, and translation thereof, from counterpart Chinese Application No. 202010117385.5 dated Oct. 28, 2023, 18 pp.

Notice of Intent to Grant and Text Intended to Grant from counterpart European Application No. 20159608.7 dated Apr. 5, 2024, 57 pp.

Second Office Action, and translation thereof, from counterpart Chinese Application No. 202010117385.5 dated Apr. 19, 2024, 8 pp.

Notice of Intent to Grant and Search Report from counterpart Chinese Application No. 202010117385.5 dated Jul. 16, 2024, 4 pp.

Extended Search Report from counterpart European Application No. 24192968.6 dated Jan. 2, 2025, 14 pp.

* cited by examiner

FIG., 9

SYSTEMS AND METHODS FOR FAULT DETECTION BASED ON PEER STATISTICS

FIELD

One exemplary aspect relates to identifying fault in a network device based on unreliable device statistics and, more particularly, methods and/or apparatus for observing the behavior of the neighboring (peer) network devices and determining the health of a device based on its unreliable state report and based on statistics collected from its peers.

BACKGROUND

Radio chipsets are often used in wireless access points such as Wi-Fi access points (AP). While the chipsets greatly simplifying the design and construction of wireless APs, the inner states of the chipsets is often difficult to assess because the counters which are exposed by the chipset are often corrupted by interference from neighboring APs. As such the information provided by the inner chipset counters provides noisy data that conveys unreliable and at times misleading information.

Thus, it can be difficult to assess if a radio transmitter is experiencing operational difficulties (e.g. stuck or has stopped transmitting). Detecting operational problems or faults can be important in resolving issues promptly. For example, if a beacon radio (or any other radio) of an access point stops transmitting, the access point is not visible to neighboring mobile wireless terminals (WT). As a result, a neighboring WT would not be able to associate or otherwise communicate with the AP. The earlier we detect that an issue occurred, the faster a technician may be notified, and/or an automated recovery mechanism may be invoked to remedy the situation. Thus, improved methods of providing reliable health status of a network component are needed, even when built in diagnostics of the network counter are providing noisy and at times misleading information.

BRIEF DESCRIPTION OF THE FIGURES

The embodiments herein may be better understood by referring to the following description in conjunction with the accompanying drawings in which like reference numerals indicate identically or functionally similar elements, of which.

DETAILED DESCRIPTION

Figure 1A:
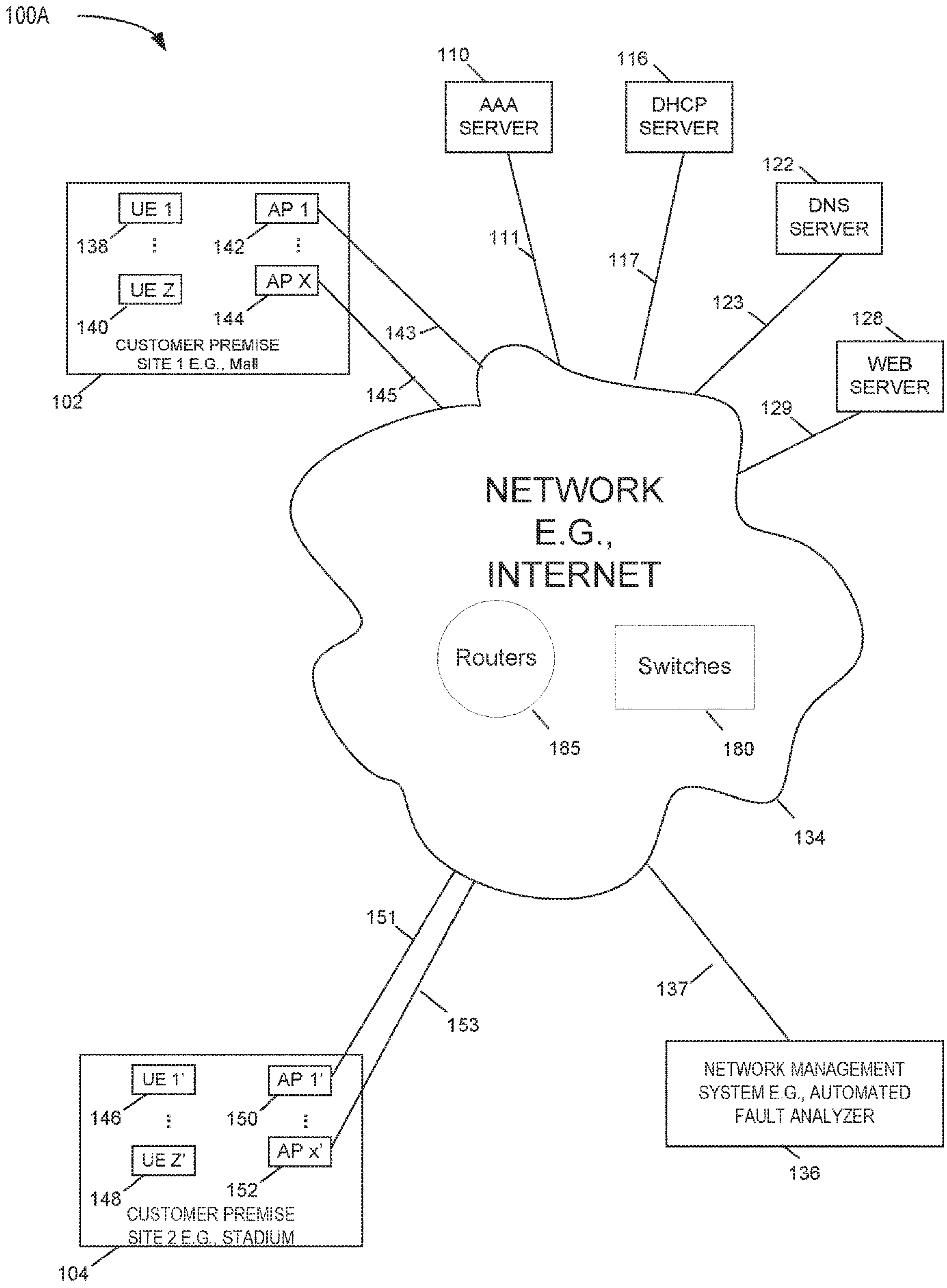
FIG. 1*a* is a block diagram illustrating an embodiment of an exemplary network environment.

Many network devices include diagnostic capabilities. These diagnostic capabilities typically maintain statistics regarding performance of the network device. These statistics may convey information relating to, for example, an amount of network traffic processed by the network device, (e.g. counts of received messages or packets, counts of transmitted messages or packets, latencies, or throughput). In some cases, these statistics rely on hardware-based analysis of network traffic. For example, a network interface chip of the network device may maintain one or more data values to support generation of these diagnostic statistics. However, these diagnostic capabilities are sometimes unreliable. For example, some network interface chips are vulnerable to interference generated by other wireless devices, which may cause corruption of their internal counters that support the diagnostics capabilities. To reduce uncertainty, and increase reliability of diagnosis of network devices, the disclosed embodiments incorporate information from neighboring (peer) devices to derive a more accurate determination about the health of a given device.

In accordance with one, non-limiting, example, a beacon radio of an AP transmits beacon messages at a particular rate (e.g. 10 beacons per second). When a wireless device receives the beacon message, it can assess the signal strength of the beacon and based on the strength of the signal to determine whether to associate with that AP. Some embodiments of an access point include a wireless radio chipset that maintains one or more counters that characterize operation of the wireless radio. In some of these embodiments, an internal counter in the radio chipset, $R_x$, counts the number of messages the AP receives in response to sending the beacon signal. However the count indicated by the $R_x$ counter may be affected by messages from other neighboring WTs and as such is not reliable. Additionally, the $R_x$ counter included in the chipset provides a cumulative count of various other parameters. This can present challenges when assessing the health of the AP solely based on the internally managed statistics of the wireless radio.

Since the internal diagnostics provided by the network device can be unreliable and thus convey little or sometimes misleading information regarding the health of the AP, a system implementing one or more of the disclosed embodiments uses a predetermined threshold to map a receive (Rx) count provided by the internal diagnostics into a binary value (e.g. either 0 or 1). When the number indicated by the Rx counter falls below a predetermined threshold, the system maps the Rx count to a first value (e.g. zero (0)) and when the number is equal or greater than the threshold, the Rx count is mapped to a second value (e.g. one (1)).

Implementations that rely on diagnostic data provided by a single AP can experience challenges. For example, implementations that make control determinations for a networked system based on data provided by a single AP, be it either raw unprocessed receive counts from internal diagnostics of an access point (e.g. the $R_x$ counter discussed above), or the binarized value of the receive count as also described above, can detect a large number of false positives or fail to detect some AP failures. This results in sub-optimal control determinations.

To improve the accuracy of these determinations, at least some of the disclosed embodiments utilize information from neighboring (peer) APs. Some embodiments place a limit on the number of neighbor or peer devices relied upon when making a determination about a particular network device. For example, some embodiments may limit the number of peer devices considered to five (5), six (6), seven (7), eight (8), nine (9), or ten (10) devices.

Some of the disclosed embodiments receive signal strength measurements from wireless terminals to determine which APs are within a predefined proximity to each other. In some embodiments, two APs, AP1 and AP2, are said to be peers if there exists a client $WT_i$ which meets the condition defined by Equation 1 below:

$$SS_1+SS_2>T_{SS} \qquad \text{Equ. 1}$$

Where:

$T_{SS}$—Pre-determined signal strength (e.g. RSSI) threshold $SS_1$— Strength of signal received by $WT_i$ from $AP_1$ $SS_2$— Strength of signal received by $WT_i$ from $AP_2$ Alternatively, in some embodiments APs identify each other's beacon signals and define an AP as a peer neighbor if a signal strength of a signal received from the other AP is greater than a predetermined threshold. Specifically, $AP_i$ and $AP_j$ are considered to be neighbors if $$SS_{i\text{->}j}>T_2 \text{ or } SS_{j\text{->}i}>T_2 \qquad \text{Eq. 2}$$

where:

$SS_{i\text{->}j}$—Strength of signal (e.g. RSSI) transmitted from $AP_i$ and received by $AP_j$ $T_2$.—Predetermined threshold In other embodiments, peers of a first AP are identified as those candidate peer APs with signal strengths, as experienced at the first AP, that are above a threshold. Some embodiments rank candidate peer APs by the signal strength, and then selects N highest ranked number of candidate APs as peer APs of the first AP. (e.g. N may be any number between one and one hundred).

To incorporate the information from the peer APs, some of the disclosed embodiments collect operational statistics from the neighboring APs. These operational statistics may include, for example, a number of clients associated with or in communication with the peer AP, or a receive counter of the peer AP. The receive counter may count a number of packets received, an amount of data received, or other metrics that quantify receive activity on the peer AP. Some embodiments store the collected operational statistics in memory. Some organize the collected operational statistics in a table, such as the example Table 1 below:

TABLE 1

| Network Device | # of Wireless Devices Associated | Receive Counter |
|---|---|---|
| $AP_i$ | 11 | 207 |
| $AP_1$ | 2 | 36 |
| $AP_2$ | 67 | 7 |
| $AP_3$ | 21 | 57 |

TABLE 1-continued

| Network Device | # of Wireless Devices Associated | Receive Counter |
|---|---|---|
| $AP_4$ | 4 | 6 |
| $AP_5$ | 38 | 102 |

$AP_i$ of Table 1 above denotes an AP whose health is being analyzed. $AP_1$ through $AP_5$ represent peers of APi as defined by, in some embodiments, either equation 1 or equation 2 above. The number of associated wireless devices indicates a time-correlated number of WTs associated with each one of the peer APs as well as the number of WTs associated with the AP whose health is being assessed. The $R_x$ counter is indicative of a number of received messages tracked by a receive counter ($R_x$) of each one of the said peer APs within a predetermined time window (e.g., one minute). In some embodiments, the receive counter is implemented in hardware, software or firmware of the respective network component.

Relating a first predetermined threshold (e.g., ten (10)) to the number of wireless devices associated with each AP, and a second predetermined threshold (e.g., fifty (50)) for the receive counter(s), the values in table 1 are mapped to either an active state or a non-active state or into one of two binary values as illustrated by table 2 below:

TABLE 2

| Network Device | Quantized Number of Clients | Quantized Receive Count |
|---|---|---|
| $AP_i$ | 0 | 0 |
| $AP_1$ | 1 | 1 |
| $AP_2$ | 0 | 1 |
| $AP_3$ | 0 | 0 |
| $AP_4$ | 1 | 1 |
| $AP_5$ | 0 | 0 |

The conversion of data as represented in table 1 to data as represented in table 2 is performed in accordance with the following in some embodiments: If the AP was active during a specific period of time, the method marks the AP state to be zero for the said time window. However, if the AP is determined to be inactive during the specific time period the method maps the state of the AP to a binary value of 1 for the said time window. (e.g. in this example, active=>0; non-active=>).

The information in table 1, is collected periodically in at least some embodiments e.g., every 60 seconds. The periodically collected information is then mapped to binary values as described above. This periodic processing generates time series of binarized data for each AP monitored.

Data within the time series is grouped into time periods that may include data collected over more than one periodic collection interval. For example, while data is collected every N seconds, data for a time period of Z seconds is grouped for further processing (withZ>N) in some embodiments.

An illustrative example of the time series for the number of clients observed by the AP whose health is assesses and by its peers is provided in table 3 below. Since each column represents a single collection event, the multiple columns represent multiple collection events over some period of time.

TABLE 3

| Network Device | Time Period 1 | Time Period 2 | Time Period 3 |
|---|---|---|---|
| $AP_i$ | 1 1 1 1 1 1 0 1 1 0 | 0 1 1 1 0 1 1 1 1 1 | 1 0 1 0 1 1 1 0 1 0 |
| $AP_1$ | 0 0 0 1 1 0 1 0 0 1 | 1 0 1 1 0 0 0 1 0 1 | 1 1 0 0 0 0 1 0 1 0 |
| $AP_2$ | 1 0 1 1 0 0 1 0 0 1 | 1 0 0 0 1 1 1 1 1 1 | 1 0 1 0 0 1 0 1 1 0 |
| $AP_3$ | 1 0 0 1 0 0 0 1 1 1 | 0 0 1 1 0 0 0 0 0 1 | 0 0 1 1 1 1 0 0 1 1 |
| $AP_4$ | 0 1 1 1 0 0 0 0 1 1 | 0 0 0 1 0 0 0 1 1 1 | 0 0 1 1 0 0 0 0 1 0 |
| $AP_5$ | 0 0 1 0 0 1 0 0 1 0 | 0 0 0 0 1 1 0 1 0 0 | 1 0 0 1 1 0 1 0 0 1 |

Similarly, Table 4 below illustrates an example mapped time series for Rx counts of the monitored network component (APi) and its peers.

TABLE 4

| Network Device | Time Period 1 | Time Period 2 | Time Period 3 |
|---|---|---|---|
| $AP_i$ | 1 1 1 0 1 0 0 0 0 0 | 1 0 0 1 1 0 0 1 0 1 | 1 0 1 0 0 1 0 0 1 1 |
| $AP_1$ | 0 1 0 0 0 0 0 1 0 0 | 1 0 1 1 1 0 1 1 0 0 | 0 1 1 0 0 1 0 1 0 1 |
| $AP_2$ | 1 1 0 0 0 1 0 0 0 1 | 1 1 1 0 1 1 1 0 0 0 | 1 0 1 1 1 1 1 0 0 0 |
| $AP_3$ | 1 0 1 1 0 1 0 1 1 1 | 0 0 0 0 1 0 0 1 0 0 | 1 0 0 0 1 0 1 1 0 1 |
| $AP_4$ | 0 1 0 1 0 1 0 0 1 1 | 0 0 1 1 0 0 1 1 1 1 | 0 0 0 1 0 0 1 0 1 0 |
| $AP_5$ | 0 0 0 0 0 0 0 1 1 0 | 0 0 0 1 1 1 1 1 0 0 | 1 0 1 1 0 1 0 0 0 0 |

To determine whether as ubject AP is active within a given time window (time period), the system analyzes the number of activity indications within each time period. For example, the method may use a first criterion (e.g. threshold of >0.2 (e.g., >20%) for the subject AP whose health is being assessed (e.g., $AP_i$) Some embodiments determine an activity state of the subject AP using a window size of W (e.g. 10) minutes. If the percentage of data values indicating activity within the time window is greater than the first threshold, the subject AP is determined to be active during that time window. A second threshold, (e.g., >0.4 {>40%}), may be used for the peer APs of the subject AP. Specifically, peer APs are considered to be active if the percentage of activity indications (e.g. zero in this example) in a given time period is greater than the second threshold.

In the Table 3 example above, during a first time window, $AP_i$ is active during two (2) of ten (10) samples and as such is determined to be non-active during that time window (0.2 is less than or equal to the first threshold, discussed above). During a second time window (also ten minutes in this example), $AP_i$ is also active for two out of 10 samples and as such it is assumed to be non-active. In a third example time period of ten minutes $AP_i$ is active four (4) out of the ten (10) samples and as such it is determined to be active. Using a value of one (1) to represent inactive and zero (0) to represent active, the three determinations above can be represented in a vector as {1, 1, 0} or (inactive, inactive, active).

For neighboring APs, a second threshold is used in some embodiments (e.g., 0.4). Using the second threshold, for the illustrated three time periods a state of peer $AP_1$ is mapped to {active, active, active} or equivalently to {0, 0, 0}. Similarly, $AP_2$ is mapped into {active, non-active, active} or equivalently to {0, 1, 0}.

A maximum duration of APi being non-active during contiguous time periods is then determined. For example, if $AP_i$ is non-active for a duration of five consecutive one minute periods (a total duration of five minutes), APi is determined to be non-active for a duration of five. Referring back to the example of table 3, the short activity series is indicative of $AP_i$ being inactive for a duration of two (non-active in the first and second time periods). This duration is stored for later use.

Next the system uses the mapping of the active states and non-active states (e.g., within the 10 minutes windows) to calculate a moving window average of the $AP_i$ active state (e.g. in this example, the active state being represented as zero). For example, assuming that the active state of the AP, is given by the series {1, 1, 0, 0, 1, 1, 0, 0, 0}, using a moving window of size two (2) results in moving window average values of {1, 0.5, 0, 0.5, 1, 0.5, 0, 0}. This moving window average is stored for further use. An average of peer APs state values is also determined. This average of peer APs state is then used to generate a moving average of the averaged peer state.

The average peer state value is given by Equation 2 below:

$$\text{Average peer state }[k] = \left(\sum_{p=1}^{num\ peers} \text{peer}_p[k]\right) / \text{num peers} \tag{2}$$

where:

Average peer state [k]—$k^{th}$ element of the average peer state vector num peers–number of peer AP activity vectors to be averaged $\text{peer}_p[k]$—$k^{th}$ element of the activity state vector of peer $AP_p$.

As an example, if the time series for states of two peer APs of $AP_i$ e.g., $AP_j$ and $AP_k$ is given by $AP_j$ State={0, 0, 0, 1, 1, 0, 0, 0, 0, 1, 1, 1}

$AP_k$ State={0, 1, 1, 1, 1, 0, 1, 0, 0, 1, 0, 1}

Where $AP_j$ and AP are neighbors of $AP_1$.

The averages of the peer AP values, via equation 2 above, are:

Avg. of $AP_i$ Peer's state value={0, 0.5, 0.5, 1, 1, 0, 0.5, 0, 0, 1, 0.5, 1}

Using a moving window of length two (2) the moving average for the above series is given by Moving Avg. of $AP_i$ Peer's state value={0.25, 0.5, 0.75, 1, 0.5, 0.25, 0.25, 0, 0.5, 0.75, 0.75}

Similar calculations are performed on data of table 4 to obtain the moving average of the percentage of non-active states as judged by the $R_x$ counter of the peers.

Based on the discussion above, a combination of one or more of the following statistics are used to derive an indication of whether $AP_i$ is operative:

a. A maximum duration of inactive indications derived from a number of devices associated with $AP_i$.
b. A percentage of active indications derived from a number of devices associated with $AP_i$ within the given time window
c. A percentage of active indications derived from a receive count of APi within a given time window
d. A moving average of active indications derived from receive counter(s) of one or more peer APs.
e. A moving average of active indications that are derived from a number of devices associated with one or more peer APs.

Some of the disclosed embodiments utilize a machine learning model to assess whether the APi is running/operational, or down/non-operational. One or more criterion for determining the APi is operational may vary by embodiment. The following example criterion are used in some embodiments:

| | |
|---|---|
| Duration > 100 | R1 |
| Percentage of inactive states derived from a number of clients for APi > 0.8 | R2 |
| Percentage of inactive states derived from an Rx count for APi > 0.8 | R3 |
| Peer moving average of inactive state indications based on Rx counter(s) < 0.3 | R4 |
| Peer moving average of inactive state indications derived from the number of associated clients < 0.2 | R5 |

In general, R1-R3 above are indicative that $AP_i$ is non-active and as such may be experiencing an operational fault. R4 and R5 examine whether the peer APs of APi are active. Some embodiments determine that APi is faulty only if it is found to be non-active and its neighbors are active.

The five rules (R1 through R5) articulated above define a five dimensional "cube" volume. A more complicated volume, rather than a simple cube, can be defined in the five-dimensional space and the determination of whether APi is experiencing an operational fault is based on whether a combined activity vector is within the said more complicated volume. Where the combined activity vector is defined by $$\text{Combined Activity Vector}=[S_1,S_2,S_3,S_4,S_5] \qquad \text{Eq. 5}$$

where:

$S_1$ is a maximum duration of inactivity within a time period, $S_2$ a percentage of time within the time period where a number of associated clients indicates inactivity, $S_3$ a percentage of time within the time period where receive counters indicate inactivity, $S_4$ moving average of inactivity indications of peer APs based on receive counters, and $S_5$ moving average of activity indications of peer APs based on number of associated clients.

While the description above includes reference to four specific activity measurements when assessing health of an AP, some embodiments may rely on one or more additional parameters not discussed above.

FIG. 1*a* illustrates an exemplary system 100*a* implemented in accordance with an exemplary embodiment. Exemplary system 100*a* includes a plurality of access points (AP1 142, . . . , AP X 144, AP 1' 150, . . . , AP X' 152), a plurality of Authentication, Authorization and Accounting (AAA) servers (only one AA server 110 is shown), a plurality of Dynamic Host Configuration Protocol (DHCP) servers (only one DHCP server 116 is shown), a plurality of Domain Name System (DNS) severs (only one DNS server 122 is shown), a plurality of Web servers (only one Web server 128 is shown), and a network management system (NMS) 136, e.g., an access point management system, which are coupled together via network 134, e.g., the Internet and/or an enterprise intranet. Network communications links (143, 145, 151, 153, 161, 163, 171, 173) couple the access points (AP1 142, AP X 144, AP 1' 150, AP X' 152), respectively, to network 134. Network communications link 111 couples the AA servers (only AA server 110 is shown) to network 134. Network communications link 117 couples the DHCP servers (only one DHCP server 116 is shown) to network 134. Network communications link 123 couples the DNS servers (only one DNS server 122 is shown) to network 134. Network communications link 129 couples the Web servers (only one Web server 128 is shown) to network 134. Exemplary system 100 further includes a plurality of clients or user equipment devices (UE 1 138, . . . , UE Z 140, UE 1' 146, . . . , UEZ' 148. At least some of the UEs (138, 140, 146, and 148) are wireless devices which may move throughout system 100.

In exemplary system 100, sets of access points are located at different customer premise site(s). Customer premise site 1 102, e.g., a mall, includes access points (AP 1 142, . . . , AP X 144). Customer premise site 2 104, e.g., a stadium, includes access points (AP 1' 150, . . . , AP X' 152). As shown in FIG. 1, UEs (UE 1 138, . . . , UE Z 140) are currently located at customer premise site 1 102; UEs (UE 1' 146, . . . , UE Z' 148) are currently located at customer premise site 2 104.

The network management system (NMS), 136, continuously collects SLE statistics related to the performance experienced by a portion or all of the clients or UEs described above. Whenever SLE degradation is experienced, the network management system, 136, and especially the automated fault analyzer module, triggers injecting action into the system, such as restarting a device or alerting an IT technician.

Figure 1B:
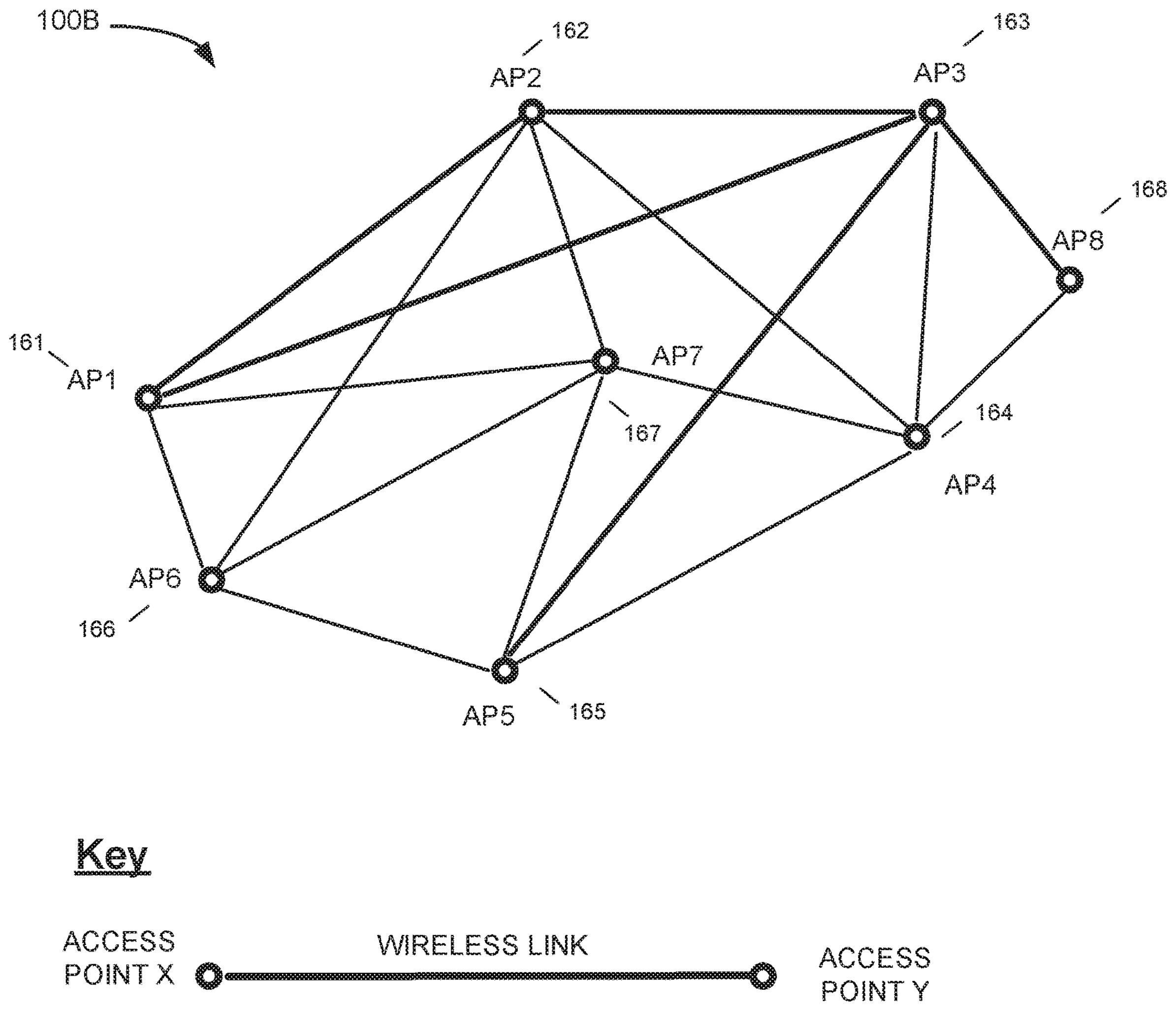
FIG. 1*b* is a block diagram illustrating an embodiment of an exemplary Wi-Fi portion of the network environment.

FIG. 1*b* illustrates an exemplary system 100*b* implemented in accordance with an exemplary embodiment. Exemplary system 100*b* includes a plurality of access points (AP1 161, AP2 162 . . . , AP 8 168), and the wireless links between these APs.

The links represent the N strongest RSSI signals to neighboring APs. In the example of FIG. 1*b* the number N=5. Based on the RSSIs, the peer neighbors for AP1 are AP2, AP3, AP7, and AP6. The peer neighbors for AP2 are AP1, AP3, AP4, AP7, and AP2. The peer neighbors for AP3 are AP1, AP2, AP8, AP4, and AP5. Similarly, the other peer neighbors can be determined for the other APs. It should be noted that while the number of peers for the above APs was limited by the predetermined parameter N=5. In contrast AP8 has only two neighboring peers, AP3 and AP4, since the strength of RSSIs from the other APs is below an RSSI threshold e.g., −75 dBm.

Figure 2:
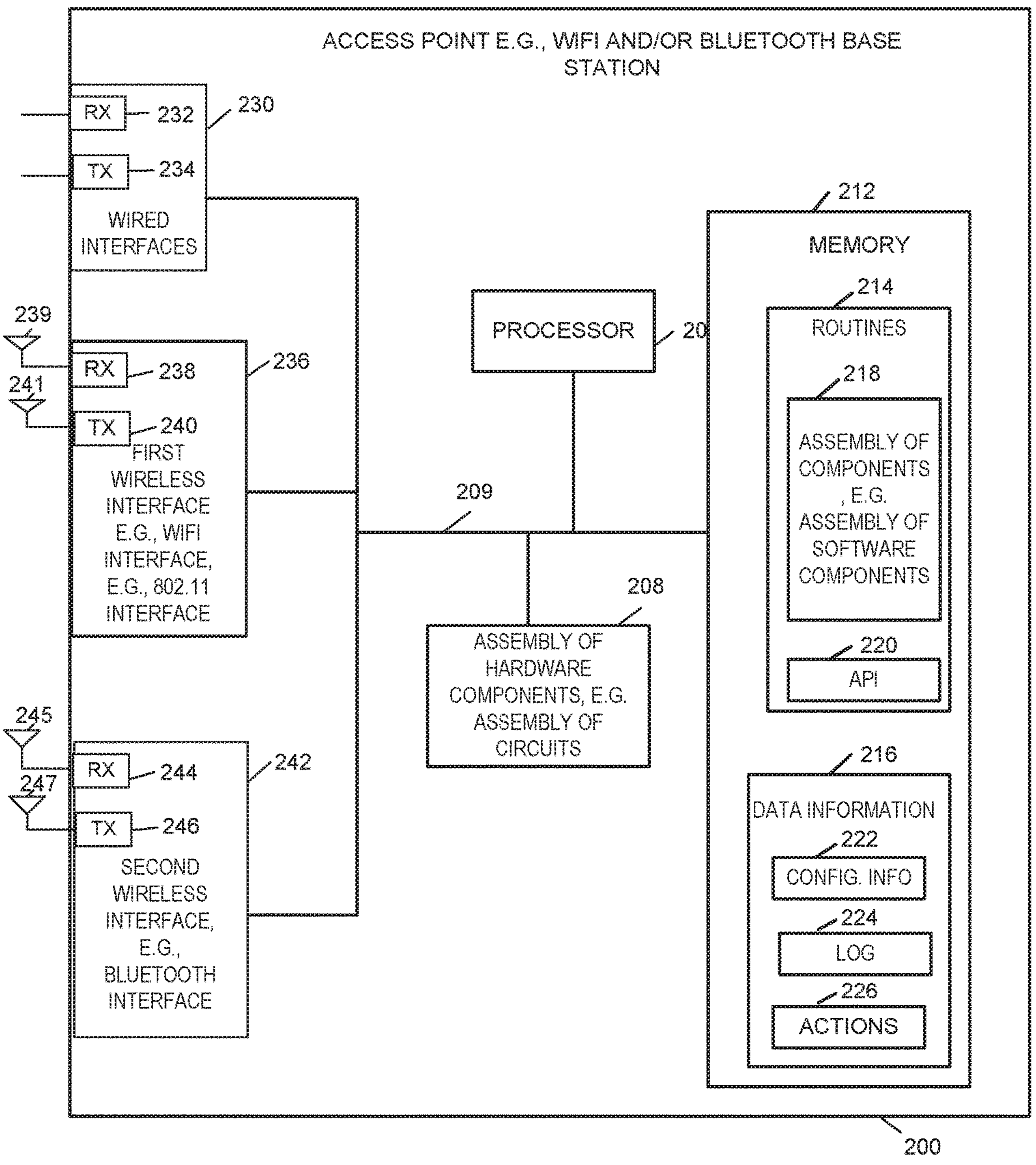
FIG. 2 is a block diagram illustrating an embodiment of an exemplary wireless access point.

FIG. 2 illustrates an exemplary access point 200 (e.g., access points AP 1 142, . . . , APX 144, AP 1' 150, . . . , APX' 152, of FIG. 1*a*) in accordance with an exemplary embodiment. Access point 200 includes wired interfaces 230, wireless interfaces 236, 242, a processor 206, e.g., a CPU, a memory 212, and an assembly of modules 208, e.g., assembly of hardware module, e.g., assembly of circuits, coupled together via a bus 209 over which the various elements may interchange data and information. Wired interface 230 includes receiver 232 and transmitter 234. The wired interface couples the access point 200 to a network and/or the Internet 134 of FIG. 1. First wireless interfaces 236 may support a Wi-Fi interface, e.g. IEEE 802.11 interface, includes receiver 238 coupled to receive antenna 239, via which the access point may receive wireless signals from communications devices, e.g., wireless terminals, and transmitter 240 coupled to transmit antenna 241 via which the access point may transmit wireless signals to communications devices, e.g., wireless terminals. Second wireless interface 242 may support Bluetooth® interface which includes receiver 244 coupled to receive antenna 245, via which the access point may receive wireless signals from communications devices, e.g., wireless terminals, and transmitter 246 coupled to transmit antenna 247 via which the access point may transmit wireless signals to communications devices, e.g., wireless terminals.

Memory 212 includes routines 214 and data/information 216. Routines 214 include assembly of modules 218, e.g., an assembly of software modules, and an Application Programming Interface ($AP_1$) 220. Data/information 216 includes configuration information 222, message event stream capture 224 and collection of remedial actions 226 to be taken in case of discovery of abnormal message flows.

Figure 3:
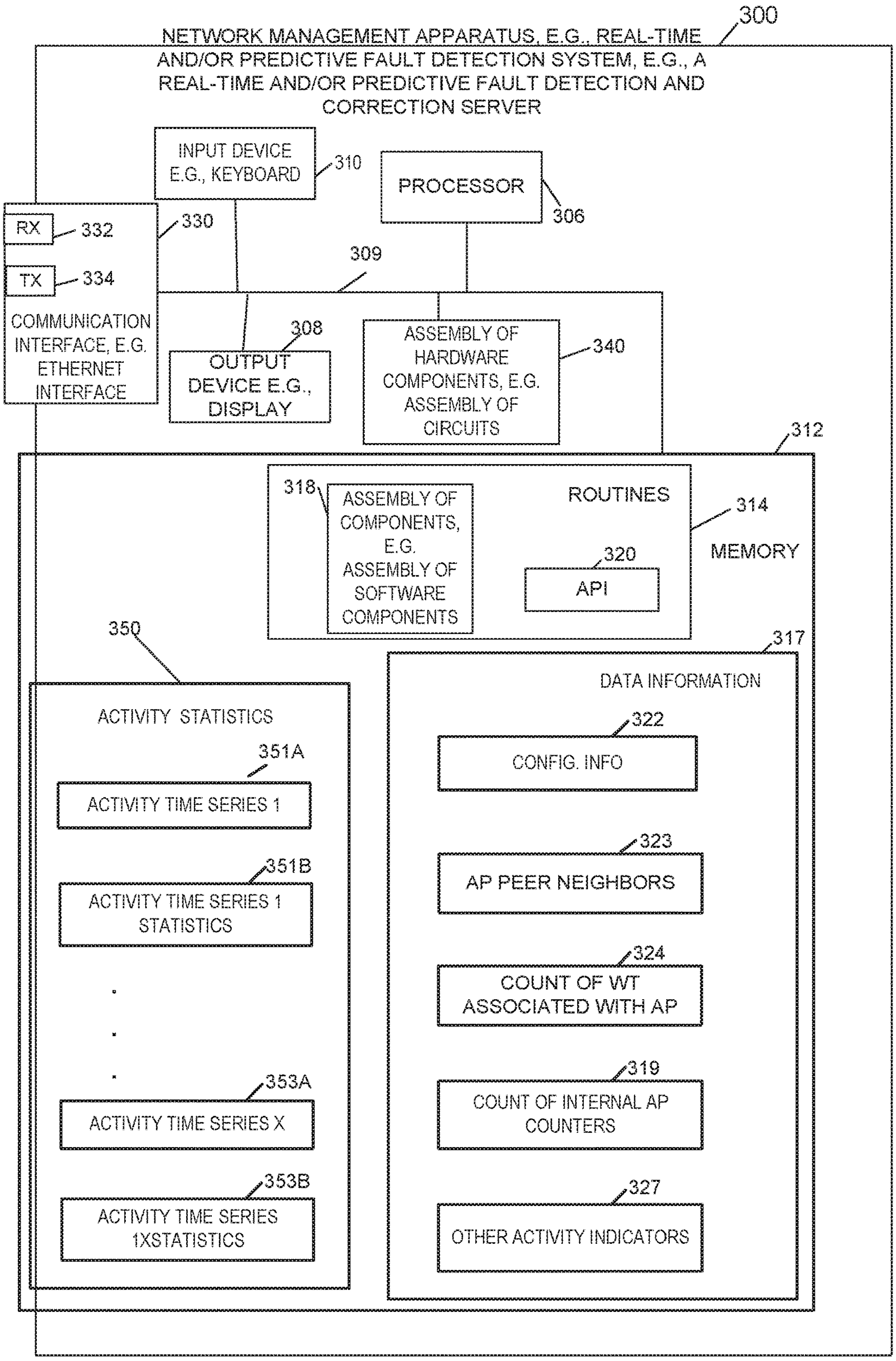
FIG. 3 is a block diagram illustrating an embodiment of an exemplary network management system including automated fault analyzer.

FIG. 3 illustrates an exemplary network management and fault detection system 300, e.g., a wireless system monitoring and fault detection server, in accordance with an exemplary embodiment. In some embodiments, network monitoring and fault detection system 300 of FIG. 3 is network management system (NMS) 136 of FIG. 1. Network management system 300 includes a communications interface 330, e.g., an Ethernet interface, a processor 306, an output device 308, e.g., display, printer, etc., an input device 310, e.g., keyboard, keypad, touch screen, mouse, etc., a memory 312 and an assembly of modules 340, e.g., assembly of hardware module, e.g., assembly of circuits, coupled together via a bus 309 over which the various elements may interchange data and information. Communications interface 330 couples the network monitoring and fault detection system 300 to a network and/or the Internet. Communications interface 330 includes a receiver 332 via which the network monitoring system can receive data and information, e.g., including RSSIs from the various APs, the number of WTs associated with each AP, counts from internal counters of APs etc., and a transmitter 334, via which the network monitoring system 300 can send data and information, e.g., including configuration information, and confirm receipt of information from other devices of the network.

Memory 312 includes routines 314 and data/information 317. Routines 314 include assembly of modules 318, e.g., an assembly of software modules.

Memory 312 includes routines 314 and data/information 317. Routines 314 include assembly of modules 318, e.g., an assembly of software modules, and Application Programming Interface (AP1) 320. Data/information 317 includes configuration information 322, peer neighbors for each AP 323, count of WT associated with each AP 324, count of internal counters Rx for each AP, and a other activity indicators, e.g., number of bytes sent by each AP 319.

Memory module 312 includes also activity statistics module 350. Module 350 includes also multiple activity time series 351, . . . 353, of historical recorded activity measurements. For example, activity measurements can include but are not limited to number of clients associated with each AP, count of Rx counter from each AP, number of bytes received by each AP from associated WTs, etc. The configuration model 322 includes, among other, parameters that are used to map the time series e.g., 351*a*, . . . , 353*a* into activity indication series e.g., 351*b*, . . . , 353*b*.

Routine 314 use the time series and the activity time series associated with each AP and its peers to determine whether AP inactivity is indicative of faulty AP or just an indicator of low network activity, e.g., wireless activity, in the vicinity close to the AP whose health is being assessed.

Figure 4:
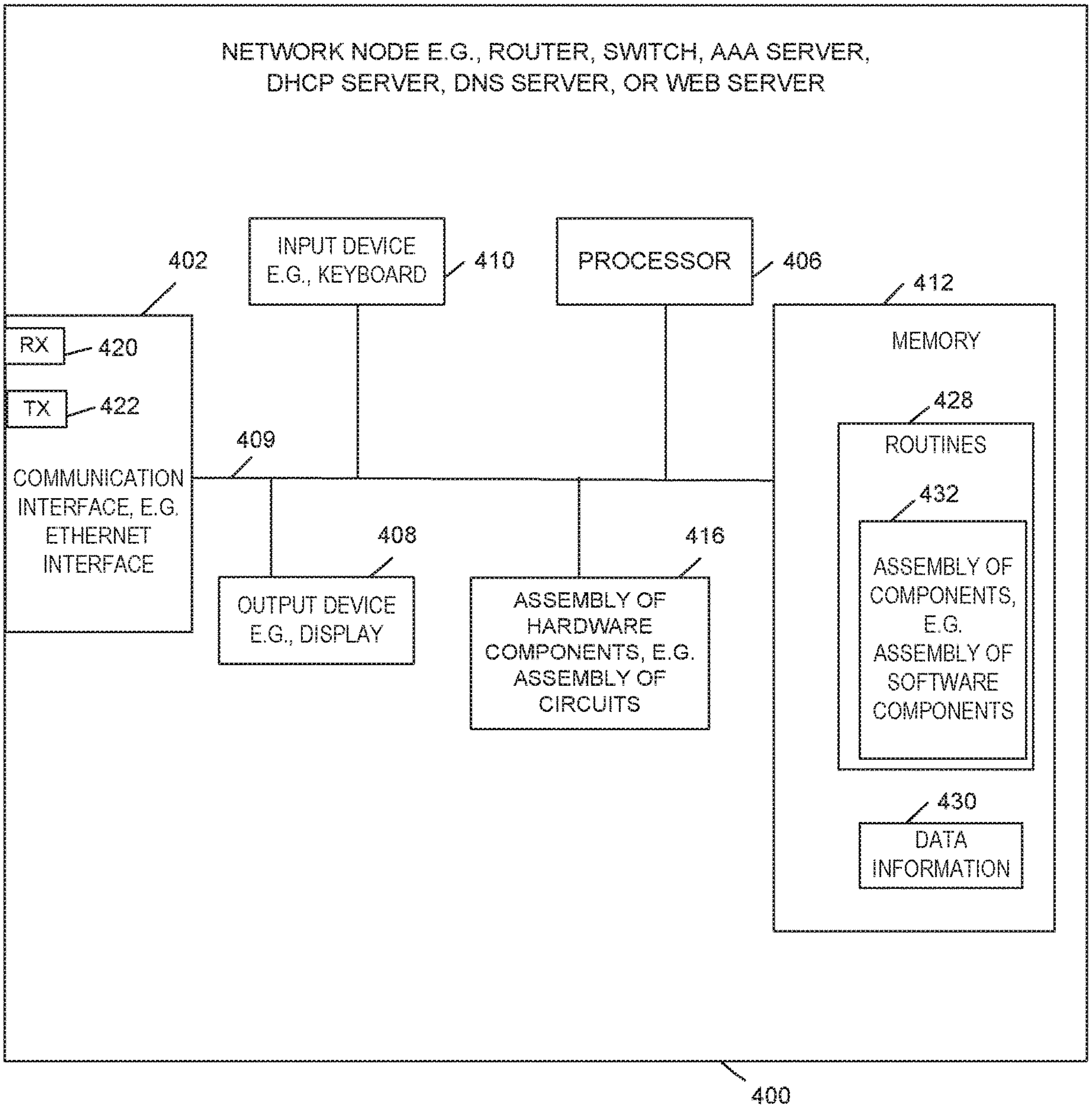
FIG. 4 is a block diagram illustrating an embodiment of an exemplary network node server.

FIG. 4 illustrates an exemplary node server 400, e.g., AA server, DHCP server, DNS server, Web server, etc. In some embodiments, node server 400 of FIG. 4 is server 110, 116, 122, 128, of FIG. 1. Node server 400 includes a communications interface 402, e.g., an Ethernet interface, a processor 406, an output device 408, e.g., display, printer, etc., an input device 410, e.g., keyboard, keypad, touch screen, mouse, etc., a memory 412 and an assembly of modules 416, e.g., assembly of hardware module, e.g., assembly of circuits, coupled together via a bus 409 over which the various elements may interchange data and information. Communications interface 402 couples the network monitoring system 400 to a network and/or the Internet. Communications interface 402 includes a receiver 420 via which the node server can receive data and information, e.g., including operation related information, e.g., registration request, AA services, DHCP requests, Simple Notification Service (SNS) look-ups, and Web page requests, and a transmitter 422, via which the node server 400 can send data and information, e.g., including configuration information, authentication information, web page data, etc.

Memory 412 includes routines 428 and data/information 430. Routines 428 include assembly of modules 432, e.g., an assembly of software modules and data information 430.

Figure 5:
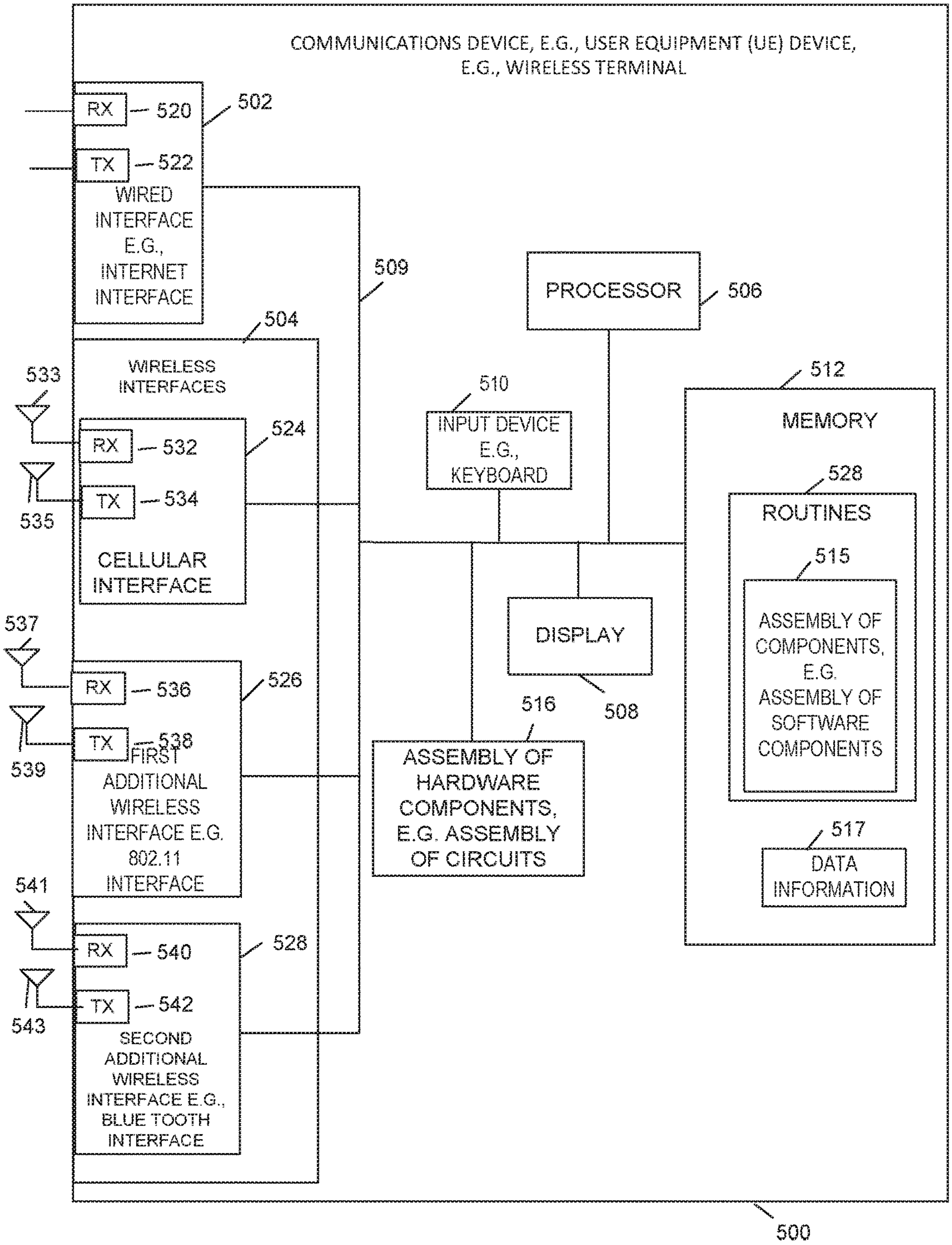
FIG. 5 is a block diagram illustrating an embodiment of an exemplary device such as user equipment (UE) or wireless terminal (WT)

FIG. 5 illustrates an exemplary client such as UE 500 (e.g., user equipment UE 1 138, . . . , UE Z 140, UE 1' 146, . . . , UE Z' 148) in accordance with an exemplary embodiment.

UE 500 includes wired interfaces 502, wireless interfaces 504, a processor 506, e.g., a CPU, a memory 512, and an assembly of modules 516, e.g., assembly of hardware modules, e.g., assembly of circuits, coupled together via a bus 509 over which the various elements may interchange data and information. Wired interface 502 includes receiver 520 and transmitter 522. The wired interface couples the UE 500 to a network and/or the Internet 134 of FIG. 1.

The exemplary wireless interface 504 can include cellular interface 524, first wireless interface 526, e.g., IEEE 802.11 WiFi interface, and a second wireless interface 528, e.g., Bluetooth® interface. The cellular interface 524 includes a receiver 532 coupled to receiver antenna 533 via which the access point may receive wireless signals from access points, e.g., AP 1 142, . . . , APX 144, AP 1' 150, . . . , APX' 152, and transmitter 534 coupled to transmit antenna 535 via which the access point may transmit wireless signals to APs, e.g., AP 1 142, . . . , APX 144, AP 1' 150, . . . , APX' 152. First wireless interfaces 526 may support a Wi-Fi interface, e.g. IEEE 802.11 interface, includes receiver 536 coupled to receive antenna 537, via which the UE may receive wireless signals from communications devices, e.g., APs, and transmitter 538 coupled to transmit antenna 539 via which the UE may transmit wireless signals to communications devices, e.g., APs. The second wireless interface 528 may support Bluetooth® which includes receiver 540 coupled to receive antenna 541, via which the UE may receive wireless signals from communications devices, e.g., APs, and transmitter 542 coupled to transmit antenna 543 via which the UE may transmit wireless signals to communications devices, e.g., APs.

Memory 512 includes routines 528 and data/information 517. Routines 528 include assembly of modules 515, e.g., an assembly of software modules. Data/information 517 may include configuration information as well as any additional information required for normal operations of UE 500.

Figure 6A:
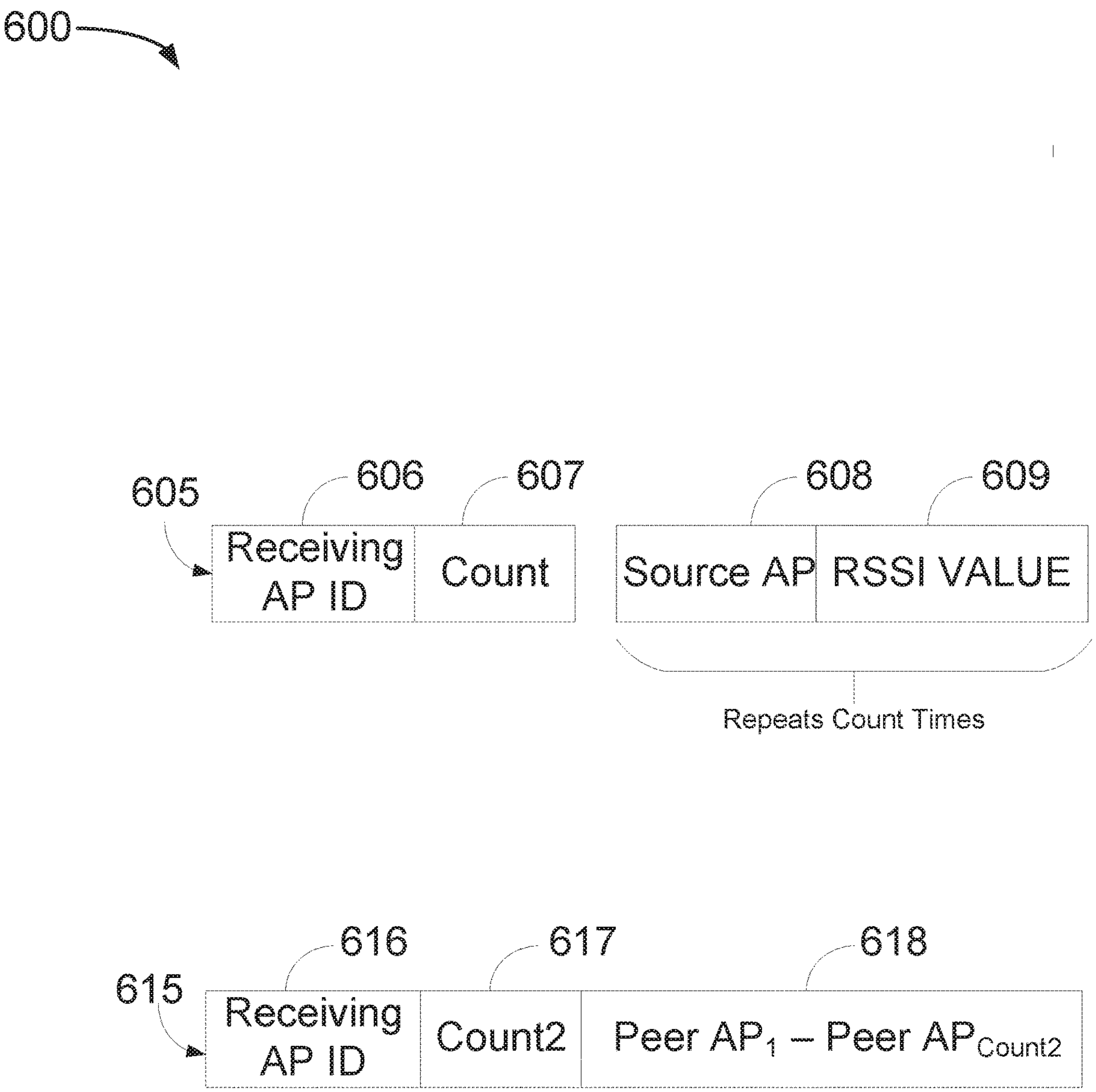
FIG. 6A is illustrative example of data structures used to determine peer neighbors.

FIG. 6A is illustrative example of data structures used to determine peer neighbors Data 605 is a data structure that stores RSSI observations by an AP. Field 606 stores an identifier of an AP receiving signals from other APs. Field 607 stores a number of RSSI measurements stored in the data structure 605. Field 608 stores an identifier of an AP generating signals received by the receiving AP (e.g. 606). Field 609 stores a RSSI value of the signals received from the AP identified by 608. Fields 608 and 609 repeat within the data structure 605 for each AP from which signals are received.

Data structure 615 provides the list of peer neighbors for each AP. Data 616 indicates the AP whose peers are being assessed. Data 617 provides the number of peers associated with AP1. In some cases, the number is limited by the number of APs whose RSSI greater than a predetermined threshold, e.g., −75 dBm. In other cases, the number is limited, for sake of reducing the amount of computation, to a predetermined threshold, e.g., 5. In this case the system determines the peers APs to be the APs from which the RSSI is the strongest. Data 618 provides a list of "Count 2" (e.g. indicated by 617) APs that have the strongest RSSIs.

Figure 6B:
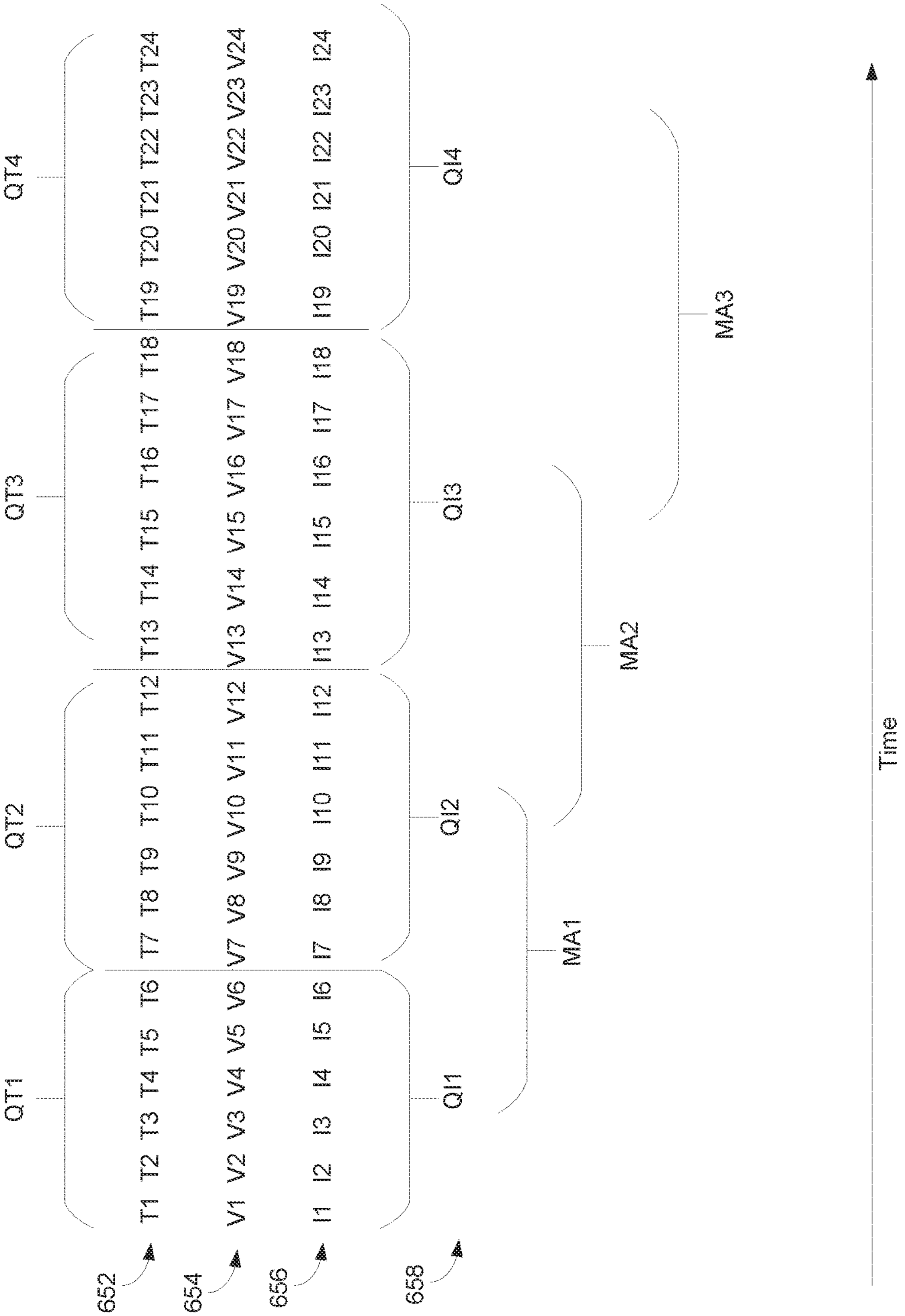
FIG. 6B is a diagram showing processing of operational parameters values in some of the disclosed embodiments.

FIG. 6B is a diagram showing processing of operational parameters values in some of the disclosed embodiments. FIG. 6B shows a time series 654 of operational parameter measurements or values V1-V24 of a network device over a sequence of corresponding time periods 652 identified as times T1-T24. The operational parameter may indicate a number of wireless devices associated with or otherwise in communication with the network device, or indicate a count of a packets or messages received and/or transmitted by the network device. In some embodiments, the processing of network parameter values illustrated in FIG. 6B is repeated for multiple types of operational parameter values (e.g. count of associated devices and receive counts, and/or additional operational network parameters).

Some of the disclosed embodiments determine activity indications of the network device. As discussed in more detail below, the determination of activity indications is based on a criterion. In some embodiments, if a value (e.g. any of V1-V24) is below a threshold, the activity indication indicates a first state of the network device (e.g. "active") and otherwise the activity indication is set to indicate a second state of the network device (e.g. "inactive). These activity indications are illustrated in FIG. 6B via activity indication time series 656, including indications I1-I24. Each numbered activity indication is derived from a corresponding equivalently numbered operational parameter measurement (e.g. I24 derived from V24, etc.). Some of the disclosed embodiments then quantify a plurality of the activity indications to generate a single quantified activity indication. Quantified activity indications are shown as a time series 658, including QI1-QI4. Each quantified activity indications represents activity of the network device during a period of time, represented in FIG. 6B as QT1-QT4. Note that each of the quantization periods QT1-QT4 include multiple operational parameter values. Thus, FIG. 6B illustrates that a sampling frequency of operational parameter values exceeds the quantization time period, at least in some embodiments. While FIG. 6B shows the quantization of activity indications from time series 656 to series 658, some embodiments do not quantify a plurality of activity indications into a single indication. In these embodiments, characterizations of the operational parameter values are based on time series 656.

As discussed above, some embodiments characterize the operational parameter of the device based on the activity indications 656 or quantized activity indications 658. For example, some embodiments generate a moving average of either activity indications 656 or 658. Example moving averages are illustrated by MA1-MA3 in FIG. 6B. MA1 is based on QI1 and QI2. MA2 is based on QI2 and QI3. MA3 is based on QI3 and QI4. The moving averages illustrated in FIG. 6B are provided to a machine learning model is some embodiments. Some embodiments determine a maximum contiguous duration in which the activity indications indicate inactivity. In some embodiments, the maximum contiguous duration is determined based on indications 656. In other embodiments, the maximum contiguous duration is determined based on indications 658. Some embodiments provide the maximum contiguous duration to the machine learning model.

Figure 7:
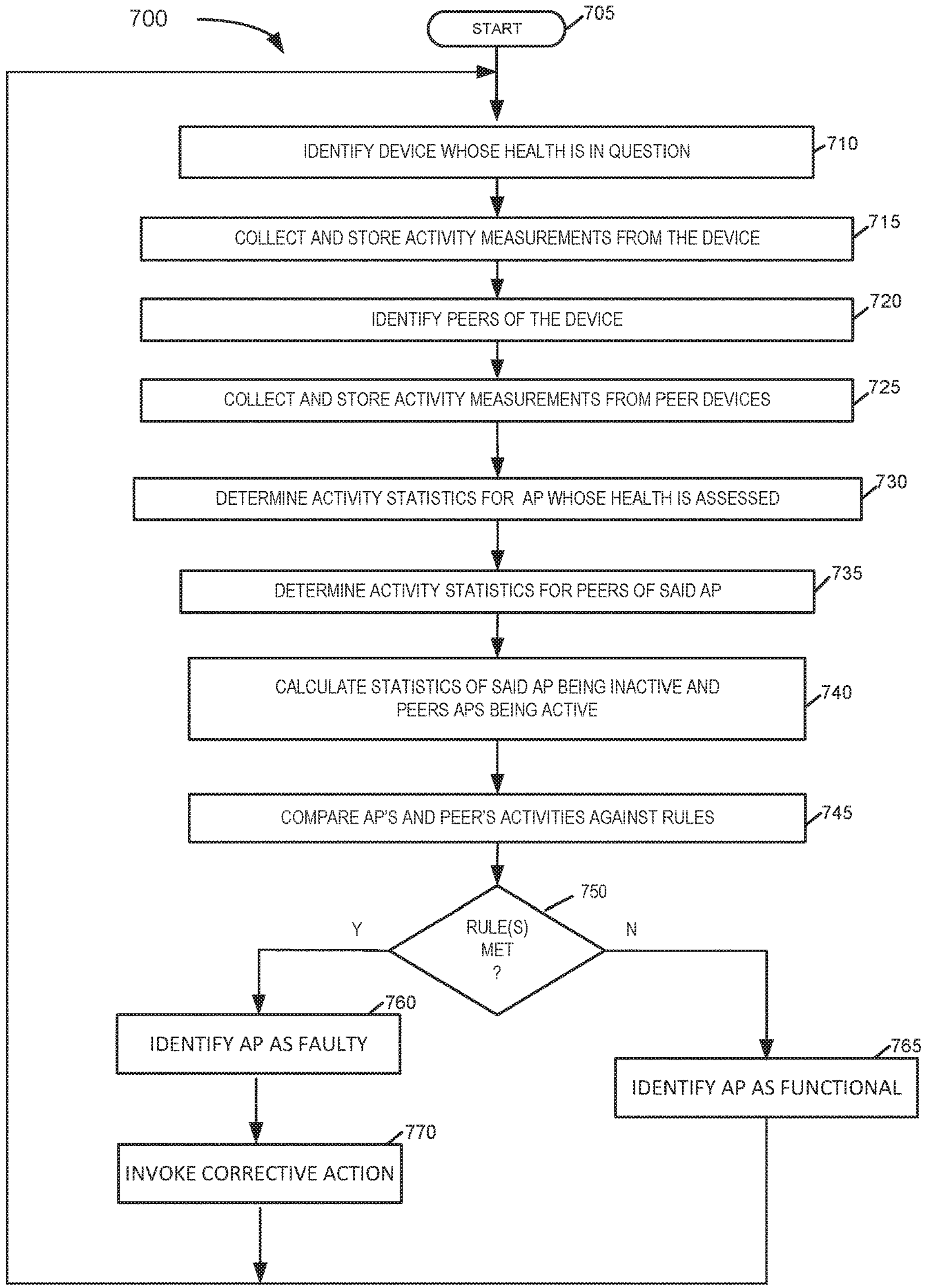
FIG. 7 is a flowchart illustrating an exemplary embodiment of process 700 by which a behavior model is established and used.

FIG. 7 is a flowchart illustrating an exemplary embodiment of process 700 by which a behavior model is established and used. In some embodiments, one or more of the functions discussed below with respect to FIG. 7 are performed by hardware processing circuitry (e.g. 406). In some embodiments, instructions (e.g. 428) stored in a memory (e.g. 412) that when executed, configure the hardware processing circuitry (e.g. 406) to perform one or more of the functions discussed below.

The process starts in step 705 and proceeds to step 710 where the system identifies a device, e.g., an AP, whose health is at question. For example, the system attempts to identify whether the transmitter of an AP if operational, determine whether the activity within the network is properly distributed among neighboring devices/APs, etc. The method continues to step 715 wherein measurements are collected by the device whose health is being assessed; the measurements are then sent to the network management system, such as server 136 of FIG. 1, for storage and further assessment.

The process proceeds to step 720 wherein the network management system identifies the peer devices, e.g., peer APs, of the AP whose health is being assessed. The peer devices are devices that the AP under assessment receives their signal with RSSI greater than a predetermined RSSI. Once the peer devices are identified, the system, in step 725, collects measurements of indicators related to activity of these peer devices.

The process proceeds to step 730 wherein the activity related measurements collected in step 715 are compared against predetermined thresholds resulting in statistics indicative of the estimated level of activity of AP whose health is being assessed. Similarly, in step 735 the activities related measurements collected in step 725 are compared against predetermined thresholds resulting in statistics indicative of the estimated level of activity of the peers of the AP whose health is being assessed.

The process proceeds to step 740 wherein the system analyzes the time series related to the activities of the AP whose health is being assesses as well as the time series of its peers, resulting in additional estimators of the levels activities of these devices.

The process proceeds to step 745 wherein a set of rules is used to process the activity related statistics for the AP whose health is estimated as well as the activity related statistics of the peers of the said AP. In accordance with first embodiment, each one of the different activity indicators is compared against an associated threshold resulting in activity indicators for the AP whose health is being assessed as well as activity indicators for its peers (e.g., see rules 1 through rule 5). In accordance with a second embodiment, the ruled are examined collectively to against a specific threshold. In accordance with a third embodiment, the estimated level of activity level of the device whose health is measured is compared against the level of activity of its peers. If the level of a specific device is much different than the level of activities of its peers, the system flags this as an issue with the balancing algorithms, e.g., roaming algorithms, and changes the roaming criteria between the device whose health is being assessed and its peers.

The process proceeds to step 750 wherein the system determined whether the conditions examined in step 745 are met. If the method in step 750 determines that the rules R1 through R5 have been met, or in other words the AP whose health is examined is not active while its peers show activity, the system in step 760 deems the AP to be faulty. Otherwise, the process moves to step 765 where the AP is deemed to be functional. Similarly, in accordance with a second embodiment, step 750 determines whether the combined vector of the activity statistics of the AP whose health is being assessed and the activity statistics of its peers is within a predetermined volume. If the system determines that the combined activity vector is within the predefined volume, the said AP is declared to be faulty in step 760. Otherwise, in step 765 the said AP is declared to be operational.

Returning to step 760, in addition to marking the AP as faulty, the method proceeds to step 770 wherein the fault detection server and/or the network management server, e.g., 136 of FIG. 1, invokes a corrective action such as restarting the faulty AP in an attempt to mitigate the issue, notifying a technician, etc.

Figure 8:
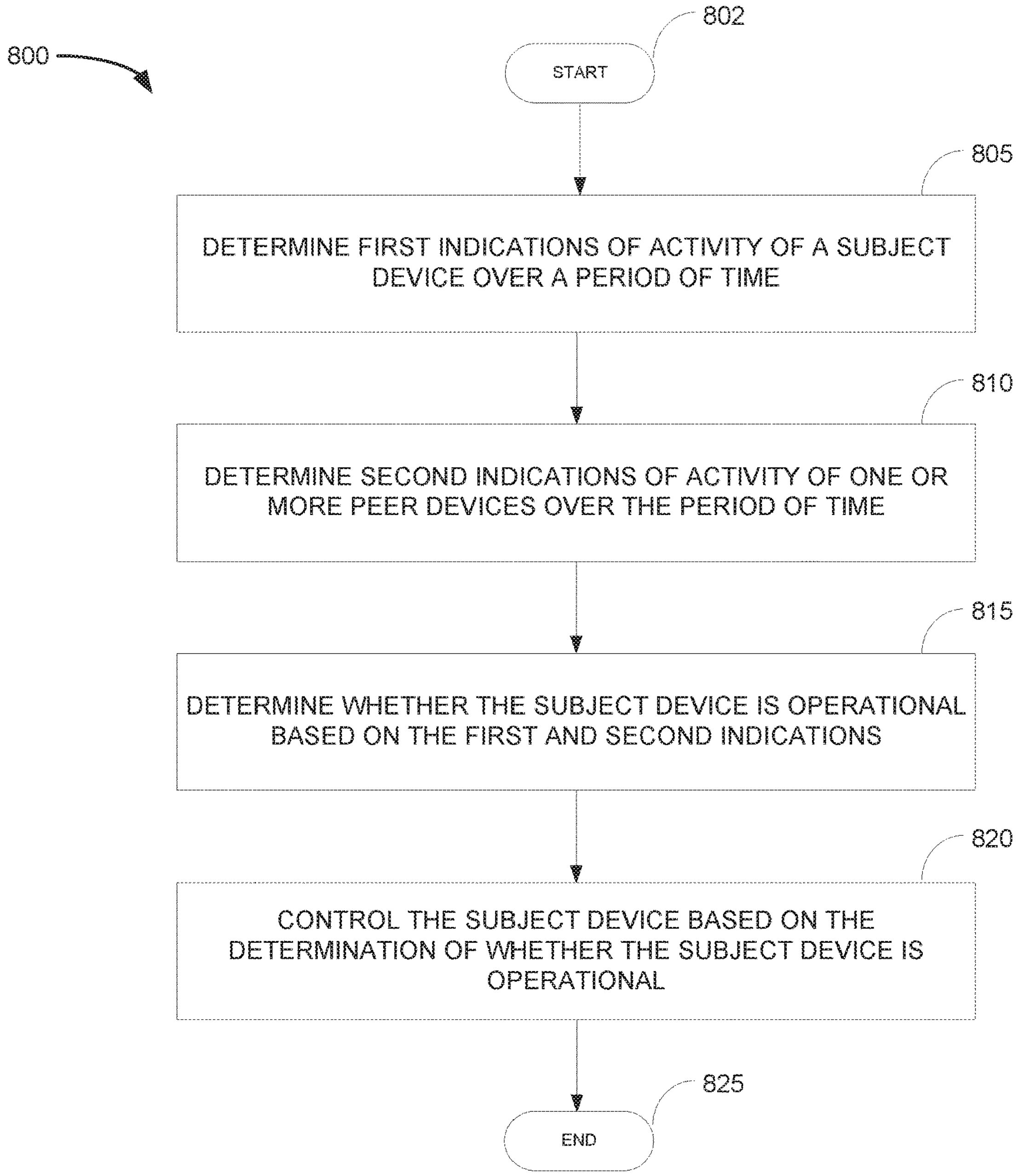
FIG. 8 is a flowchart of a process for determining whether a network component is operational.

FIG. 8 is a flowchart of a process for determining whether a network component is operational. In some embodiments, one or more of the operations discussed below with respect to FIG. 8 are performed by hardware processing circuitry (e.g. 506). For example, instructions (e.g. 528) stored in a memory (e.g. 512) configure the hardware processing circuitry to perform one or more of the operations discussed below with respect to FIG. 8 and process 800. In some embodiments, process 800 is performed by the network management system 136. In operation 805, first indications of activity are determined for a subject device. Operation 805 includes, in some embodiments, obtaining operational parameter values of the subject device. For example, the operational parameter values may be received via a network connection between the operational device and a network management device. As discussed above, the operational parameters may include one or more of a count of a packets or messages received by the subject device during a predetermined time period, or a number of wireless devices in communication with, or associated with (e.g. association between a station and an access point) with the subject device during the predetermined time period.

The operational parameter values are characterized in various embodiments. In some embodiments, the operational parameter values are binarized into indications of whether the subject device is active (or operational) or inactive (or non-operational) during a time period. The binarization is based on a threshold specific to the operational parameter (e.g. receive count or # of associated devices). Since the operational parameter values are periodically collected over time, operation 805 generates a time series of binarized indications of activity or inactivity. In some aspects, the time series is further quantized to reduce the number of activity indications included in the time series. For example, in some embodiments, process 1100 is applied to the generated time series of operation 805.

A moving average of these activity indications are determined in some embodiments. A maximum contiguous period or duration of inactivity indications within the collection time period is also determined in some embodiments.

In operation 810, second indications of activity are determined for one or more neighboring devices of the subject device. Operation 810 includes, in some embodiments, obtaining operational parameter values of each of the neighboring devices. For example, in some embodiments, the operational parameter values are received via a network connection between each neighboring device and a network management device. As discussed above, in some embodiments, the operational parameter values represent one or more of a count of a packets or messages received by each of the neighbor (peer) device(s) during a predetermined time period, or a number of wireless devices in communication with, or associated with (e.g. association between a station (e.g., WT or UE) and an access point) the respective neighboring device during the predetermined time period.

Similar to the first operational parameter values, the second operational parameters are characterized in various embodiments. In some embodiments, the second operational parameters are used to determine indications of whether the respective neighboring device is active (or operational) or inactive (or non-operational). The determination is based on a criterion specific to the operational parameter (e.g. receive count or # of associated devices). Since, in some embodiments, the second operational parameter values are periodically collected over time. In these embodiments, operation 810 generates a time series of indications of activity or inactivity for each neighboring device. In some embodiments, each of these generated time series is quantized to reduce the number of, or summarize, the individual activity determinations that are each based on a single operational parameter value. For example, in some embodiments, operation 810 utilizes process 1100, described below, to quantize each time series of activity indications for a neighboring device, thus reducing the number of activity indications representing the neighboring device for a time period.

In some embodiments, when there are multiple time series of activity indications for corresponding multiple peer/neighboring devices, the multiple time series are averaged or otherwise aggregated in some embodiments into a single time series collectively representing the neighboring devices of the subject device. A moving average of these aggregated binarized time series are determined in some embodiments. This results in another time series of moving averages.

Operation 815 determines whether the subject device is operational. The determination is made based on the first and second indications. In some embodiments, this determination is based on one or more of the characterizations of the first operational parameters and one or more of the characterizations of the second operational parameters discussed above. In some embodiments these characterizations are provided to a machine learning model, and the determination is based on an output of the machine learning model, as described above.

In operation 820, the subject device is conditionally controlled based on the determination of operation 815. In some embodiments, if the subject device is operational, no control inputs are provided to the subject device. In some embodiments, if the subject device is determined to be non-operational, the subject device may be restarted, powered down, or reset. In some embodiments, the subject device is conditionally controlled by installing a different version of firmware, bios, or software to the subject device (e.g. different than a previous version installed on the subject device when the operational parameters were determined). In some embodiments, if the subject device is determined to be non-operational one or more alerts are generated. The alerts may be generated via any means known in the art, including email, text, pager, or other messaging technology. In some embodiments, an alert generated by operation 820 functions to notify a human IT technician, who may provide manual intervention to return the device to an operable status.

Figure 9:
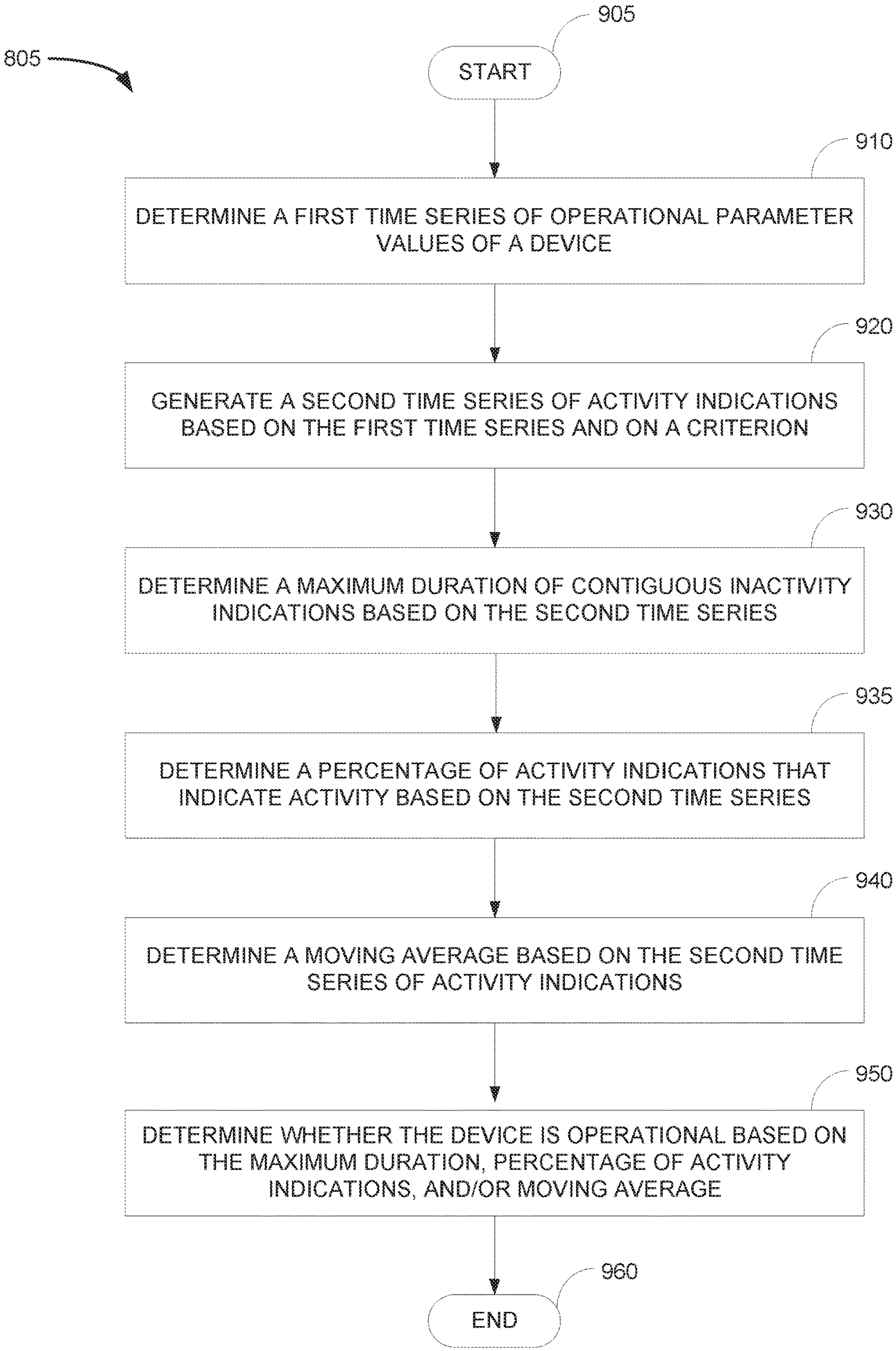
FIG. 9 is a flowchart of a process for determining whether a network component is operational.

FIG. 9 is a flowchart of a process 805 for determining whether a network component is operational. In some embodiments, one or more of the operations discussed below with respect to FIG. 9 are performed by hardware processing circuitry (e.g. 506). For example, instructions (e.g. 528) stored in a memory (e.g. 512) configure the hardware processing circuitry to perform one or more of the operations discussed below with respect to FIG. 9. The operations of FIG. 9 below are discussed with respect to a single operational parameter. However, one of skill would understand that process 805 could be repeated in some embodiments for multiple different types of operational parameters. For example, some embodiments perform process 805 for at least a counter of received packets or messages and a count of a number of wireless devices associated with or in communication with a subject device (e.g. APi as discussed above). Process 805 may be further repeated for additional operational parameters considered by the disclosed embodiments.

After start operation 905, process 805 moves to operation 910. In operation 910, a first time series of operational parameters values of a device are determined. For example, as discussed above, a network device can include diagnostic capabilities that provide for collection of various statistics, including, for example, a count of a number of packets or message received and/or transmitted, a number of devices in communication with or associated with the network device, memory usage, CPU utilization, or other operational parameters. The operational parameters are collected multiple times from the network device, in some embodiments, periodically, so as to create a time series of operational parameter values.

In operation 920, a second time series of activity indications are generated. The second time series is generated based on the first time series and based on a criterion. For example, in some embodiments, the criterion compares each value in the first time series to a threshold. Based on the comparison, in some embodiments, each value in the first time series in binarized into one of two possible values. One of the values indicates activity of the device, while a second of the binary values indicates a lack of activity by the device. As one example, a low number of received packets may indicate, in some embodiments, that a device is not active. In some embodiments, a very high number of received packets can also indicate inactivity or a faulty device. The values of the second time series generated in operation 920 indicate inactivity or activity of the device during the time period in which the corresponding operational parameter value in the first time series was collected.

Operation 930 determines a maximum duration of contiguous inactivity indications in the values of the second time series. The maximum duration can be represented in number of indications or elapsed time of the contiguous inactivity.

Operation 935 determines a percentage of activity indications in the second time series that indicate activity. Alternative embodiments determine a percentage of activity indications in the second time series that indicate inactivity.

Operation 940 determines a moving average of the second time series of activity indications. The moving average relies on a window of indications used to compute the moving average, which may be any number of indications between e.g., two (2) and one hundred (100) measurements, or any number. The moving average also relies on a number of measurements that overlap between sequential moving average computations. The number of overlapping measurements (or non-overlapping measurements) can also vary by embodiment. For example, one non-overlapping measurement may exist between sequential moving average measurements in some embodiments, but other numbers are contemplated.

In operation 950, a determining is made as to whether the device is operational or not. The determination is based on one or more of the duration, percentage of activity indications (percentage of inactivity indications), or the moving average. As discussed above, one or more of these characterizations of the operational parameter are provided to a machine learning model in some embodiments, and the determination of operational status of the device is based on an output of the machine learning model. After operation 950, process 805 moves to end state 960.

Figure 10:
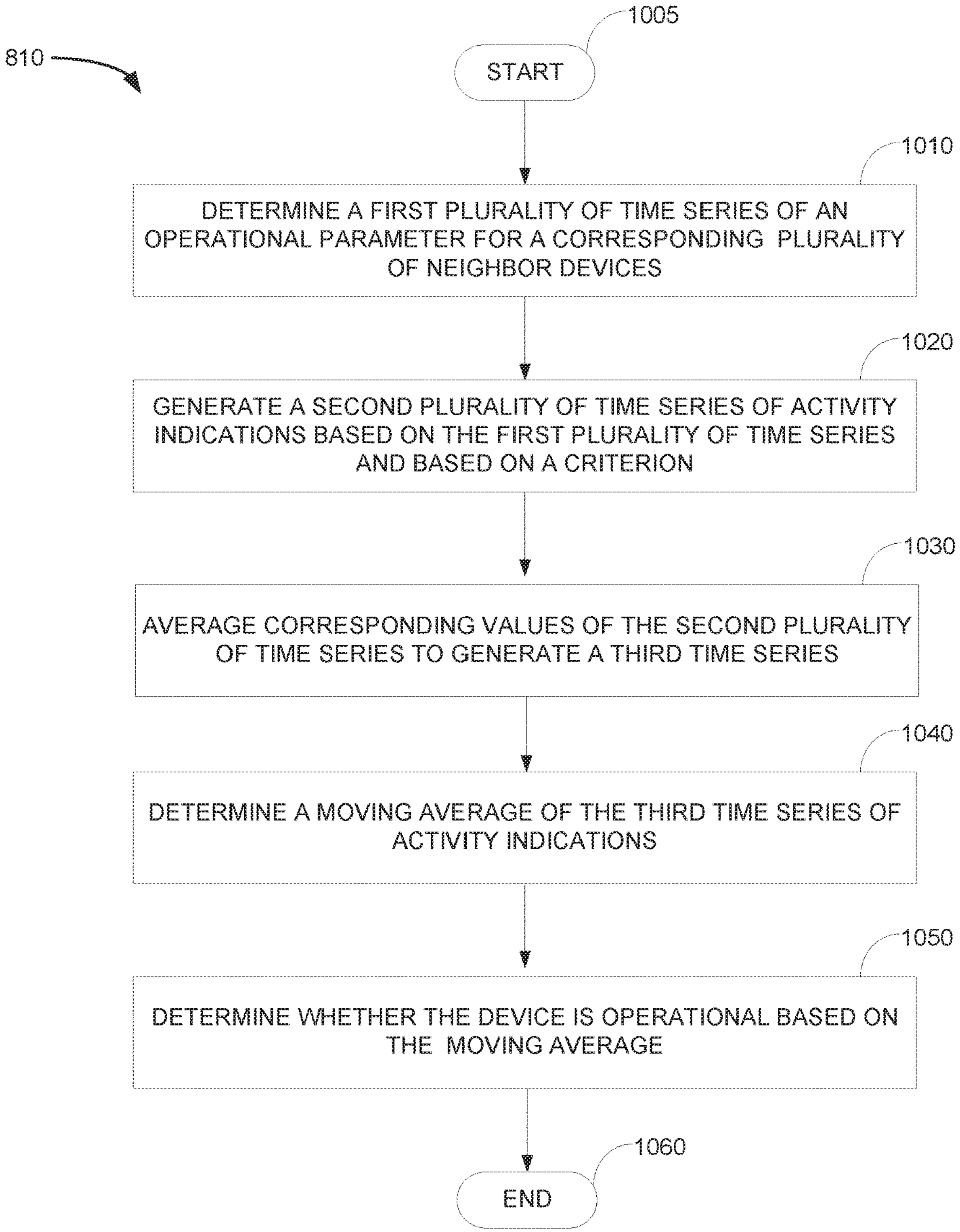
FIG. 10 is a flowchart of a process for determining whether a network component is operational.

FIG. 10 is a flowchart of a process 810 for determining whether a network component is operational. In some embodiments, one or more of the operations discussed below with respect to FIG. 10 are performed by hardware processing circuitry (e.g. 506). For example, instructions (e.g. 528) stored in a memory (e.g. 512) configure the hardware processing circuitry to perform one or more of the operations discussed below with respect to FIG. 10.

After start operation 1005, process 810 moves to operation 1010. In operation 1010, a first plurality of time series of operational parameters values for a corresponding plurality of peer devices of a subject device are determined. For example, as discussed above, a device subject to a determination of operability (e.g. APi) may be within a proximity of other devices (peer or neighboring devices). This proximity is determined, in various aspects, based on visibility of signals emitted by the neighboring device(s) and received at the subject device (or vis-versa). Operational parameters are collected from those peer devices in operation 1010. The operational parameters may include counter(s) of a number of packets received and/or sent by each of the respective peer devices, and/or a number of wireless devices associated with each of the peer devices. Other operational parameters are also contemplated, such as a number of packet errors, network jitter measurements, latency, throughout, or other statistics. This statistical information about each of the peer devices can be obtained, in at least some embodiments, from diagnostic capabilities built into each of the peer devices. In some cases, the peer devices include hardware that maintains such statistical information. In other embodiments, the information is maintained via firmware or software-based implementations. In some embodiments, the operational parameters of each peer device are collected multiple times from the peer device, in some embodiments, periodically, so as to create a time series of operational parameter values (e.g. a single time series in the first plurality of time series).

In operation 1020, a second plurality of time series corresponding to each of the peer or neighboring devices discussed above with respect to operation 1010 is generated. Each of the time series in the second plurality is comprised of values that indicate activity of the respective neighboring device. Each time series in the second plurality is based on a corresponding time series in the first plurality. (e.g. a first time series of operational parameter values of a first peer device is used to generate a corresponding second time series in the second plurality). In some embodiments, the indications of activity are determined by applying one or more criterion to the values of the corresponding first time series of operation 1010. For example, operation 1020 may compare each of the values in a time series of the first plurality to a predetermined threshold and based on the results of the comparison, sets a corresponding value in a time series of the second plurality of time series. In some embodiments, operation 1020 binarizes, based on the one or more criterion, values in the first plurality of time series to generate the second plurality of time series.

In operation 1030, corresponding values in the second plurality of time series are aggregated to generate a third time series. In some embodiments, the aggregation averages the corresponding values. Alternatively, a median of the corresponding values may be used for aggregation.

In operation 1040, a moving average of the third time series of activity information is determined. The moving average window size and/or overlap size (within the window) may vary by embodiments. Some embodiments use a window size of two activity indications. In other words, two activity indications are used to define each moving average in these embodiments. Some embodiments use an overlap size of (window size—1).

Operation 1050 determines whether the subject device is operational based on the moving average. As discussed above, in some embodiments, one or more characterizations of the peer AP operational parameters may be used to make the determination. In some embodiments, these characterizations are provided to a machine learning model, and an output of the machine learning model is used to make the operational determination.

Figure 11:
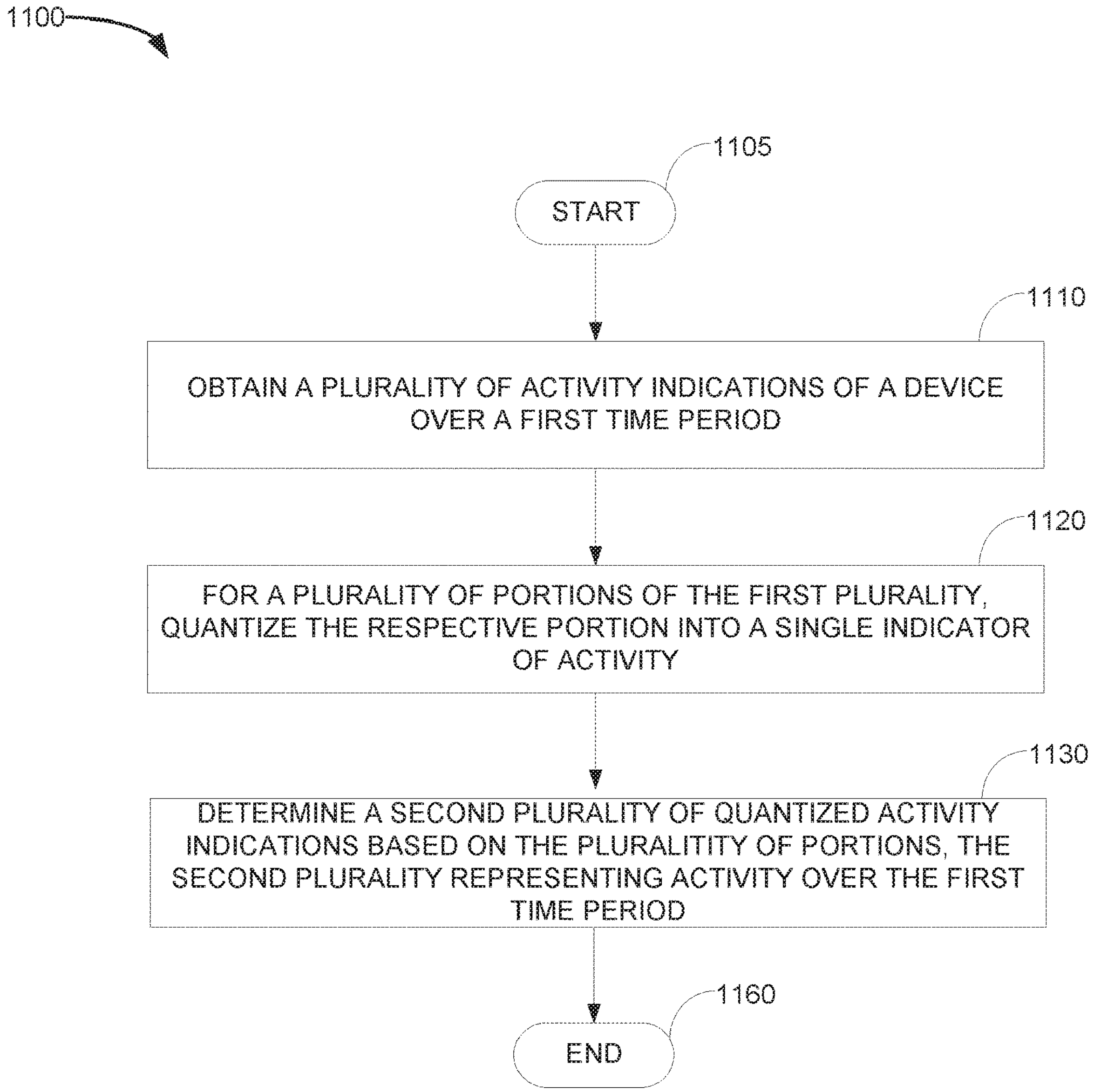
FIG. 11 is a flowchart of a process for quantizing operational parameter measurements.

FIG. 11 is a flowchart of a process 1100 for quantizing operational parameter measurements. In some embodiments, one or more of the operations discussed below with respect to FIG. 11 are performed by hardware processing circuitry (e.g. 506). For example, instructions (e.g. 528) stored in a memory (e.g. 512) configure the hardware processing circuitry to perform one or more of the operations discussed below with respect to FIG. 11. Process 1100 of FIG. 11 is used in some embodiments to reduce a first number of operational parameter measurements to a smaller number of activity indications.

After start operation 1105, process 1100 moves to operation 1110, which obtains a plurality of activity indications of a device over a first time period. For example, as discussed above with respect to operations 920 and 1020, some embodiments determine a plurality of activity determinations based on a corresponding plurality of operational parameter values. Each of these pluralities can represent a time series in at least some embodiments, in that each operational parameter measurement and/or activity determination represents a state of the network device within a discrete period of time, and the pluralities are organized by time in at least some embodiments. Thus, operation 1110 obtains the plurality of activity indications from, in some embodiments, operations 920 or 1020.

In operation 1120, the plurality of activity indications include a plurality of portions. Each portion represents an equivalent amount of elapsed time (e.g. ten minutes). Thus, collectively the plurality of activity indications of operation 1110 represent a period of time that is an aggregation of elapsed times represented by each portion. Each of the portions is quantized into a single indicator of activity. The quantization is based on a criterion. In some aspects, the criterion compares a number of activity indications in the portion that indicate a particular activity value (e.g. active or inactive), and set the single indicator based on the number. In some embodiments, if the number meets a criterion (e.g. greater than a quantization threshold), the single indicator is set to a first value and otherwise is set to a second value.

In operation 1130, a second plurality of quantized activity indications is generated based on the plurality of portions. The second plurality includes a single activity indicator for each portion included in the first plurality of activity indications. In some embodiments, the second plurality of quantized activity indications are used by process 800 of FIG. 8, process 805 of FIG. 9, and/or process 810 of FIG. 10.

Figure 12:
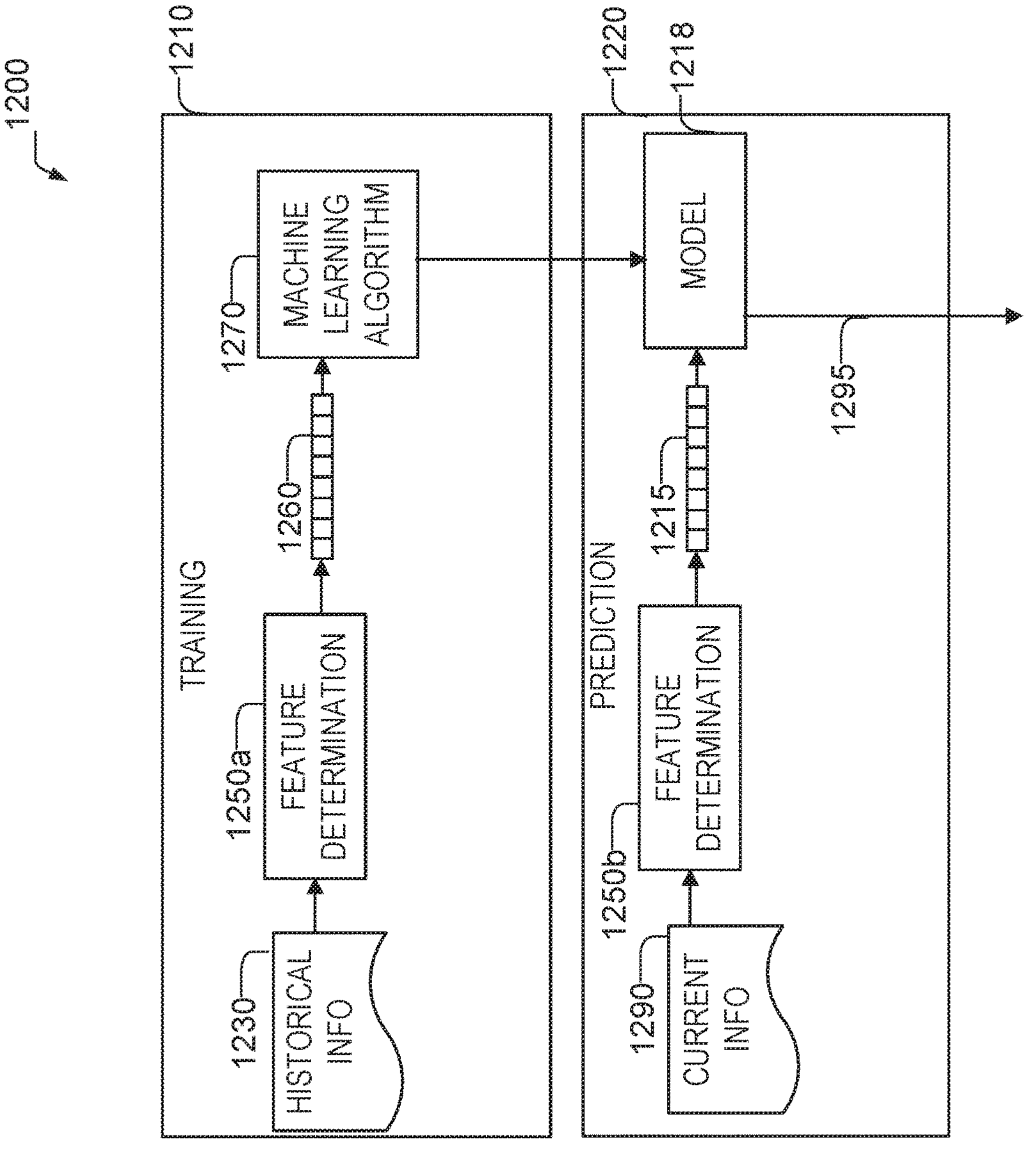
FIG. 12 shows an example machine learning module according to some examples of the present disclosure.

FIG. 12 shows an example machine learning module 1200 according to some examples of the present disclosure. Machine learning module 1200 utilizes a training module 1210 and a prediction module 1220. Training module 1210 inputs historical information 1230 into feature determination module 1250*a*. The historical information includes information derived from one or more network devices. In various embodiments, the historical information includes one or more of operational parameter values as discussed above. The historical information 1230 may be labeled. Labels may indicate whether a subject network device was operational or not during the time in which operational parameter values or characterizations of same, associated with the label, were measured or otherwise recorded.

In some embodiments, the machine learning module 1200 described below with respect to FIG. 12 is invoked as part of process 800, discussed above with respect to FIG. 8. In some embodiments, the prediction module 1220 is performed as part of process 800, and the training module 1210 is performed prior to execution of process 800. In some embodiments, one or more functions discussed below with respect to the machine learning module 1200 are executed by the network management system 136.

Feature determination module 1250*a* determines one or more features 1260 from this historical information 1230. Stated generally, features 1260 are a set of the information input and is information determined to be predictive of a particular outcome. For example, the features can include, in various embodiments, one or more characterizations of the operational parameter values included in the historical information. This may include, for example, such as activity indications, quantized activity indications, moving averages of the activity indications, and/or maximum continuous durations of inactive indications. The machine learning algorithm 1270 produces a model 1218 based upon the features 1260 and the associated labels.

In the prediction module 1220, current information 1290 may be input to the feature determination module 1250. For example, operational parameter values and/or characterizations of same of a subject network device and/or neighbor or peer devices of the subject network device are included in the current information. Feature determination module 1250*b* may determine the same set of features or a different set of features (e.g. characterizations of operational parameter values) from the current information 1290 as feature determination module 1250*a* determined from historical information 1230. In some examples, feature determination module 1250*a* and 1250*b* are the same module. Feature determination module 1250*b* produces feature vector 1215, which is input into the model 1218 to generate an indication of operational status of the subject network device 1295. The training module 1210 may operate in an offline manner to train the model 1218. The prediction module 1220, however, may be designed to operate in an online manner. It should be noted that the model 1218 may be periodically updated via additional training and/or user feedback.

The machine learning algorithm 1270 maybe selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, hidden Markov models, models based on artificial life, simulated annealing, and/or virology. Examples of unsupervised learning algorithms include expectation-maximization algorithms, vector quantization, and information bottleneck method. Unsupervised models may not have a training module 1210. In an example embodiment, a regression model is used and the model 1280 is a vector of coefficients corresponding to a learned importance for each of the features in the vector of features 1260, 1215. To calculate a score, a dot product of the feature vector 1215 and the vector of coefficients of the model 306 is taken in some embodiments.

While the above-described flowcharts have been discussed in relation to a particular sequence of events, it should be appreciated that changes to this sequence can occur without materially effecting the operation of the embodiment(s). Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel Xeon® family of processors, the Intel® Atom™ family of processors, the Intel Itanium® family of processors, Intel Core®i5-4670K and i7-4770K 22 nm Haswell, Intel® Core®i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S® processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods maybe readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has at least been provided systems and methods for enhancing and improving communications reliability. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

Example 1 is a method to determine whether a network component is operable, comprising: determining first operational parameter values of the network component; determining one or more neighboring devices of the network component; determining second operational parameter values of the one or more neighboring devices; determining whether the network component is operational based on the first operational parameter values of the network component and the second operational parameter values of the one or more neighboring devices; and conditional controlling the network component based on whether the network component is determined to be operational.

In Example 2, the subject matter of Example 1 optionally includes wherein the determining of the one or more neighboring devices of the network component comprises: obtaining a list of devices from which signals have been received over a wireless medium by the network component; and determining the neighboring devices by comparing a strength of signals received from each device in the list of devices to a signal strength threshold.

In Example 3, the subject matter of any one or more of Examples 1-2 optionally include wherein the first operational parameters values of the network component indicate a number of messages received or a number of wireless terminals associated with the network component, and the method further comprises determining a maximum contiguous duration in which the operational parameter values indicate the network component is inactive, wherein the determining of whether the network component is operational is based on the maximum contiguous duration.

In Example 4, the subject matter of Example 3 optionally includes providing the maximum contiguous duration to a machine learning model, wherein the determining of whether the network component is operational is based on an output of the machine learning model.

In Example 5, the subject matter of any one or more of Examples 1-4 optionally include wherein the second operational parameter values of the neighboring devices indicate a count of messages received at a respective neighboring device or a number of wireless terminals associated with the respective neighboring device.

In Example 6, the subject matter of Example 5 optionally includes wherein determining whether the network component is operational comprises one or more of: generating indications of activity of the network device based on the first operational parameter values; and determining a moving average of the activity indications, wherein the determining of whether the network component is operational is based on the moving average.

In Example 7, the subject matter of Example 6 optionally includes providing the moving average to a machine leaning model, wherein the determining of whether the network component is operational is based on an output of the machine learning model.

In Example 8, the subject matter of any one or more of Examples 6-7 optionally include wherein the determining of whether the network component is operational comprises: generating first indications of activity of a first neighboring device based on the second operational parameter values of the first neighboring device; generating second indications of activity of a second neighboring device based on the second operations parameter values of the second neighboring device; aggregating the corresponding first and second indications of activity; generating third activity indications based on the aggregation; and generating a moving average of the third activity indications, wherein the determining of whether the network component is operational is based on the moving average.

In Example 9, the subject matter of Example 8 optionally includes providing the moving average to a machine leaning model, wherein the determining of whether the network component is operational is based on an output of the machine learning model.

In Example 10, the subject matter of anyone or more of Examples 5-9 optionally include wherein determining whether the network component is operational comprises: generating activity indications of the network device based on the first operational parameter values; determining a percentage of the activity indications that indicate activity, wherein the determining of whether the network component is operational is based on the binarized values.

In Example 11, the subject matter of anyone or more of Examples 1-10 optionally include wherein conditionally controlling the network component comprises powering down the network component or resetting the network component.

In Example 12, the subject matter of anyone or more of Examples 1-11 optionally include generating an alert in response to a determining that the network component is not operational.

Example 13 is a system to determine whether a network component is operable, comprising: hardware processing circuitry; one or more hardware memories storing instructions that when executed configure the hardware processing circuitry to perform operations comprising: determining first operational parameter values of the network component; determining one or more neighboring devices of the network component; determining second operational parameter values of the one or more neighboring devices; determining whether the network component is operational based on the first operational parameter values of the network component and the second operational parameter values of the one or more neighboring devices; and conditional controlling the network component based on whether the network component is determined to be operational.

In Example 14, the subject matter of Example 13 optionally includes wherein the determining of the one or more neighboring devices of the network component comprises: obtaining a list of devices from which signals have been received over a wireless medium by the network component; and determining the neighboring devices by comparing a strength of signals received from each device in the list of devices to a signal strength threshold.

In Example 15, the subject matter of anyone or more of Examples 13-14 optionally include wherein the first operational parameters values of the network component indicate a number of messages received or a number of wireless terminals associated with the network component, and the method further comprises determining a maximum contiguous duration in which the operational parameter values indicate the network component is inactive, wherein the determining of whether the network component is operational is based on the maximum contiguous duration.

In Example 16, the subject matter of Example 15 optionally includes the operations further comprising providing the maximum contiguous duration to a machine learning model, wherein the determining of whether the network component is operational is based on an output of the machine learning model.

In Example 17, the subject matter of any one or more of Examples 13-16 optionally include wherein the second operational parameter values of the neighboring devices indicate a count of messages received at a respective neighboring device or a number of wireless terminals associated with the respective neighboring device.

In Example 18, the subject matter of Example 17 optionally includes wherein determining whether the network component is operational comprises one or more of: generating indications of activity of the network device based on the first operational parameter values; and determining a moving average of the activity indications, wherein the determining of whether the network component is operational is based on the moving average.

In Example 19, the subject matter of Example 18 optionally includes the operations further comprising providing the moving average to a machine leaning model, wherein the determining of whether the network component is operational is based on an output of the machine learning model.

In Example 20, the subject matter of any one or more of Examples 18-19 optionally include wherein the determining of whether the network component is operational comprises: generating first indications of activity of a first neighboring device based on the second operational parameter values of the first neighboring device; generating second indications of activity of a second neighboring device based on the second operations parameter values of the second neighboring device; aggregating the corresponding first and second indications of activity; generating third activity indications based on the aggregation; and generating a moving average of the third activity indications, wherein the determining of whether the network component is operational is based on the moving average.

In Example 21, the subject matter of Example 20 optionally includes the operations further comprising providing the moving average to a machine leaning model, wherein the determining of whether the network component is operational is based on an output of the machine learning model.

In Example 22, the subject matter of any one or more of Examples 17-21 optionally include wherein determining whether the network component is operational comprises: generating activity indications of the network device based on the first operational parameter values; determining a percentage of the activity indications that indicate activity, wherein the determining of whether the network component is operational is based on the binarized values.

In Example 23, the subject matter of any one or more of Examples 13-22 optionally include wherein conditionally controlling the network component comprises powering down the network component or resetting the network component.

In Example 24, the subject matter of anyone or more of Examples 13-23 optionally include the operations further comprising generating an alert in response to a determining that the network component is not operational.

Example 25 is a non-transitory computer readable storage medium storing instructions that when executed, configure hardware processing circuitry to determine whether a network component is operable, the operations comprising: determining first operational parameter values of the network component; determining one or more neighboring devices of the network component; determining second operational parameter values of the one or more neighboring devices; determining whether the network component is operational based on the first operational parameter values of the network component and the second operational parameter values of the one or more neighboring devices; and conditional controlling the network component based on whether the network component is determined to be operational.

In Example 26, the subject matter of Example 25 optionally includes wherein the determining of the one or more neighboring devices of the network component comprises: obtaining a list of devices from which signals have been received over a wireless medium by the network component; and determining the neighboring devices by comparing a strength of signals received from each device in the list of devices to a signal strength threshold.

In Example 27, the subject matter of anyone or more of Examples 25-26 optionally include wherein the first operational parameters values of the network component indicate a number of messages received or a number of wireless terminals associated with the network component, and the method further comprises determining a maximum contiguous duration in which the operational parameter values indicate the network component is inactive, wherein the determining of whether the network component is operational is based on the maximum contiguous duration.

In Example 28, the subject matter of Example 27 optionally includes providing the maximum contiguous duration to a machine learning model, wherein the determining of whether the network component is operational is based on an output of the machine learning model.

In Example 29, the subject matter of any one or more of Examples 25-28 optionally include wherein the second operational parameter values of the neighboring devices indicate a count of messages received at a respective neighboring device or a number of wireless terminals associated with the respective neighboring device.

In Example 30, the subject matter of Example 29 optionally includes wherein determining whether the network component is operational comprises one or more of: generating indications of activity of the network device based on the first operational parameter values; and determining a moving average of the activity indications, wherein the determining of whether the network component is operational is based on the moving average.

In Example 31, the subject matter of Example 30 optionally includes providing the moving average to a machine leaning model, wherein the determining of whether the network component is operational is based on an output of the machine learning model.

In Example 32, the subject matter of any one or more of Examples 30-31 optionally include wherein the determining of whether the network component is operational comprises: generating first indications of activity of a first neighboring device based on the second operational parameter values of the first neighboring device; generating second indications of activity of a second neighboring device based on the second operations parameter values of the second neighboring device; aggregating the corresponding first and second indications of activity; generating third activity indications based on the aggregation; and generating a moving average of the third activity indications, wherein the determining of whether the network component is operational is based on the moving average.

In Example 33, the subject matter of Example 32 optionally includes providing the moving average to a machine leaning model, wherein the determining of whether the network component is operational is based on an output of the machine learning model.

In Example 34, the subject matter of any one or more of Examples 30-33 optionally include wherein determining whether the network component is operational comprises: generating activity indications of the network device based on the first operational parameter values; determining a percentage of the activity indications that indicate activity, wherein the determining of whether the network component is operational is based on the binarized values.

In Example 35, the subject matter of anyone or more of Examples 25-34 optionally include wherein conditionally controlling the network component comprises powering down the network component or resetting the network component.

In Example 36, the subject matter of anyone or more of Examples 25-35 optionally include the operations further comprising generating an alert in response to a determining that the network component is not operational.

The invention claimed is:

1. A method comprising:

determining, by one or more hardware processors of a network management system, first operational parameter values of a network device, the first operational parameter values indicative of activity of the network device;

determining, by the one or more hardware processors, one or more neighboring network devices of the network device;

determining, by the one or more hardware processors, second operational parameter values of the one or more neighboring network devices, the second operational parameter values indicative of activity of the one or more neighboring network devices;

providing, by the one or more hardware processors and to a machine learning model trained with operational parameter values of network devices and corresponding labels indicating whether the network devices are operational or non-operational, the first operational parameter values indicative of activity of the network device and the second operational parameter values indicative of activity of the one or more neighboring network devices to determine whether the network device is one of operational or non-operational; and conditionally controlling, by the one or more processors, the network device based on whether the network device is determined to be operational or non-operational.

2. The method of claim 1, wherein determining of the one or more neighboring network devices of the network device comprises:

obtaining a list of devices from which signals have been received over a wireless medium by the network device; and determining the one or more neighboring network devices by comparing a strength of signals received from each device in the list of devices to a signal strength threshold.

3. The method of claim 1, wherein the first operational parameters values indicative of activity of the network device indicate a count of messages received at the network device or a number of wireless terminals associated with the network device, wherein the method further comprises determining, by the one or more hardware processors, a maximum contiguous duration in which the first operational parameter values indicate the network device is inactive, and wherein providing, to the machine learning model, the first operational parameters comprises providing, to the machine learning model, the maximum contiguous duration.

4. The method of claim 1, wherein the second operational parameter values indicative of activity of the one or more neighboring network devices indicate a count of messages received at a respective neighboring network device or a number of wireless terminals associated with the respective neighboring network device.

5. The method of claim 4, wherein providing, to the machine learning model, the first operational parameters comprises:

generating activity indications of the network device based on the first operational parameter values indicative of activity of the network device;

determining a moving average of the activity indications; and providing, to the machine learning model, the moving average.

6. The method of claim 4, wherein providing, to the machine learning model, the first operational parameters comprises:

generating activity indications of the network device based on the first operational parameter values indicative of activity of the network device;

determining a percentage of the activity indications that indicate activity of the network device; and providing, to the machine learning model, the percentage of the activity indications that indicate activity of the network device.

7. The method of claim 1, wherein conditionally controlling the network device comprises powering down the network device or resetting the network device.

8. The method of claim 1, further comprising:

mapping each of the first operational parameters indicative of activity of the network device to one of an active state or a non-active state based on predetermined thresholds for each of the first operational parameters;

mapping each of the second operational parameters indicative of activity of the one or more neighboring network devices to one of the active state or the non-active state based on predetermined thresholds for each of the second operational parameters, wherein determining of whether the network device is one of operational or non- operational is further based on a comparison of the mappings of each of the first operational parameters to the mappings of each of the second operational parameters.

9. The method of claim 1, wherein the first operational parameters indicative of activity of the network device include (1) a first count of messages received at the network device or (2) a first number of wireless terminals associated with the network device, wherein the second operational parameters indicative of activity of the one or more neighboring network devices include (3) a second count of messages received at the respective neighboring network device or (4) a second number of wireless terminals associated with the respective neighboring network device, and wherein determining whether the network device is one of operational or non-operational is further based on:

a comparison of (1) the first count of messages received at the network device to (3) the second count of messages received at the respective neighboring network device; or a comparison of (2) the first number of wireless terminals associated with the network device to (4) the second number of wireless terminals associated with the respective neighboring network device.

10. The method of claim 1, wherein determining whether the network device is one of operational or non-operational further comprises:

determining, by the machine learning model, that the first operational parameter values indicate that the network device is inactive;

determining, by the machine learning model, that the second operational parameter values indicate that the one or more neighboring network devices are inactive; and determining, by the machine learning model, the network device is operational based at least in part on both the first operational parameter values that indicate that the network device is inactive and the second operational parameter values that indicate that the one or more neighboring network devices are inactive.

11. The method of claim 1, wherein determining whether the network device is one of operational or non-operational further comprises:

determining, by the machine learning model, that the first operational parameter values indicate that the network device is inactive;

determining, by the machine learning model, that the second operational parameter values indicate that the one or more neighboring network devices are active; and determining, by the machine learning model, the network device is non-operational based at least in part on both the first operational parameter values that indicate that the network device is inactive and the second operational parameter values that indicate that the one or more neighboring network devices are active.

12. A system comprising:

hardware processing circuitry;

one or more hardware memories storing instructions that when executed configure the hardware processing circuitry to perform operations comprising:

determining first operational parameter values of a network device, the first operational parameter values indicative of activity of the network device;

determining one or more neighboring network devices of the network device;

determining second operational parameter values of the one or more neighboring network devices, the second operational parameter values indicative of activity of the one or more neighboring network devices;

providing, by the one or more hardware processors and to a machine learning model trained with operational parameter values of network devices and corresponding labels indicating whether the network devices are operational or non-operational, the first operational parameter values indicative of activity of the network device and the second operational parameter values indicative of activity of the one or more neighboring network devices to determine whether the network device is one of operational or non-operational; and conditionally controlling the network device based on whether the network device is determined to be operational or non-operational.

13. The system of claim 12, wherein determining of the one or more neighboring network devices of the network device comprises:

obtaining a list of devices from which signals have been received over a wireless medium by the network device; and determining the one or more neighboring network devices by comparing a strength of signals received from each device in the list of devices to a signal strength threshold.

14. The system of claim 12, wherein the first operational parameters values indicative of activity of the network device indicate a count of messages received at the network device or a number of wireless terminals associated with the network device, wherein the operations further comprise determining a maximum contiguous duration in which the first operational parameter values indicate the network device is inactive, and wherein providing, to the machine learning model, the first operational parameters comprises providing, to the machine learning model, the maximum contiguous duration.

15. The system of claim 12, wherein the second operational parameter values indicative of activity of the one or more neighboring network devices indicate a count of messages received at a respective neighboring network device or a number of wireless terminals associated with the respective neighboring network device.

16. The system of claim 15, wherein providing, to the machine learning model, the first operational parameters comprises:

generating activity indications of the network device based on the first operational parameter values indicative of activity of the network device;

determining a first moving average of the activity indications; and providing, to the machine learning model, the first moving average.

17. The system of claim 16, wherein providing, to the machine learning model, the first operational parameters comprises:

generating first indications of activity of a first neighboring network device of the one or more neighboring network devices based on the second operational parameter values indicative of activity of the first neighboring network device;

generating second indications of activity of a second neighboring network device of the one or more neighboring network devices based on the second operational parameter values indicative of activity of the second neighboring network device;

aggregating the corresponding first and second indications of activity;

generating third activity indications based on the aggregation;

generating a second moving average of the third activity indications, wherein determining of whether the network device is one of operational or non-operational is based on the second moving average; and providing, to the machine learning model, the second moving average of the third activity indications.

18. The system of claim 15, wherein providing, to the machine learning model, the first operational parameters comprises:

generating activity indications of the network device based on the first operational parameter values indicative of activity of the network device;

determining a percentage of the activity indications that indicate activity of the network device; and providing, to the machine learning model, wherein the percentage of the activity indications that indicate activity of the network device.

19. The system of claim 12, wherein conditionally controlling the network device comprises powering down the network device or resetting the network device.

20. Non-transitory computer readable storage media storing instructions that when executed, configure hardware processing circuitry to perform operations comprising:

determining first operational parameter values of a network device, the first operational parameter values indicative of activity of the network device;

determining one or more neighboring network devices of the network device;

determining second operational parameter values of the one or more neighboring network devices, the second operational parameter values indicative of activity of the one or more neighboring network devices;

providing, by the one or more hardware processors and to a machine learning model trained with operational parameter values of network devices and corresponding labels indicating whether the network devices are operational or non-operational, the first operational parameter values indicative of activity of the network device and the second operational parameter values indicative of activity of the one or more neighboring network devices to determine whether the network device is one of operational or non-operational; and conditionally controlling the network device based on whether the network device is determined to be operational or non-operational.

* * * * *